US012226670B2

(12) United States Patent
Hacking et al.

(10) Patent No.: US 12,226,670 B2
(45) Date of Patent: Feb. 18, 2025

(54) SYSTEM, METHOD AND APPARATUS FOR ELECTRICALLY ACTUATED PEDAL FOR AN EXERCISE OR REHABILITATION MACHINE

(71) Applicant: ROM TECHNOLOGIES, INC., Brookfield, CT (US)

(72) Inventors: S. Adam Hacking, Nashua, NH (US); Daniel Lipszyc, Glasgow, MT (US); Jeff Cote, Raymond, NH (US)

(73) Assignee: ROM Technologies, Inc., Brookfield, CT (US)

( * ) Notice: Subject to any disclaimer, the term of this patent is extended or adjusted under 35 U.S.C. 154(b) by 0 days.

(21) Appl. No.: 17/243,126

(22) Filed: Apr. 28, 2021

(65) Prior Publication Data

US 2021/0244998 A1 Aug. 12, 2021

Related U.S. Application Data

(63) Continuation of application No. 16/813,224, filed on Mar. 9, 2020, now Pat. No. 11,541,274.
(Continued)

(51) Int. Cl.
*A63B 22/06* (2006.01)
*A61H 1/02* (2006.01)
(Continued)

(52) U.S. Cl.
CPC ....... *A63B 22/0605* (2013.01); *A61H 1/0214* (2013.01); *A63B 21/00072* (2013.01);
(Continued)

(58) Field of Classification Search
CPC ............ A63B 22/0605; A63B 22/0664; A63B 21/00072; A63B 21/00076;
(Continued)

(56) References Cited

U.S. PATENT DOCUMENTS 59,915 A 11/1866 Lallement
363,522 A 5/1887 Knous
(Continued)

FOREIGN PATENT DOCUMENTS

CA 3193419 A1 3/2022
CN 2885238 Y 4/2007
(Continued)

OTHER PUBLICATIONS

"HCL Fitness, HCI Fitness physio trainer," announced 2009 [online], retrieved on Nov. 10, 2020, www.amazon.com/HCI-Fitness-Physio Trainer-Upper-Ergonometer/dp/B001 P5GUGM.
(Continued)

*Primary Examiner* — Loan B Jimenez
*Assistant Examiner* — Kathleen M Fisk
(74) *Attorney, Agent, or Firm* — Dickinson Wright PLLC; Jonathan H. Harder; Stephen A. Mason

(57) ABSTRACT

A pedal assembly for electromechanical exercise or rehabilitation of a user is disclosed and can include pedals to engage appendages of a user. A spindle supports each pedal and has a spindle axis. A pedal arm assembly is located between the spindle and a rotational axle of the equipment. The pedal arm assembly is radially offset from the spindle axis to define a range of radial adjustability for the pedal relative to the rotational axle. The pedal arm assembly can include an electrically-actuated coupling assembly to adjust the radial position of the pedal in response to a control signal, and regulate motion of the user engaged with the pedals.

17 Claims, 13 Drawing Sheets

Related U.S. Application Data

(60) Provisional application No. 62/816,557, filed on Mar. 11, 2019, provisional application No. 62/816,550, filed on Mar. 11, 2019.

(51) Int. Cl.

| | |
|---|---|
| ***A63B 21/00*** | (2006.01) |
| ***A63B 21/005*** | (2006.01) |
| ***A63B 24/00*** | (2006.01) |
| ***A63B 71/00*** | (2006.01) |
| *A63B 21/22* | (2006.01) |

(52) U.S. Cl.
CPC .. *A63B 21/00076* (2013.01); *A63B 21/00178* (2013.01); *A63B 21/0058* (2013.01); *A63B 21/0059* (2015.10); *A63B 21/154* (2013.01); *A63B 21/4034* (2015.10); *A63B 22/0664* (2013.01); *A63B 24/0062* (2013.01); *A63B 24/0087* (2013.01); *A63B 21/227* (2013.01); *A63B 2022/0682* (2013.01); *A63B 2024/0068* (2013.01); *A63B 2024/0093* (2013.01); *A63B 2071/009* (2013.01); *A63B 2220/51* (2013.01); *A63B 2220/62* (2013.01); *A63B 2220/833* (2013.01); *A63B 2225/50* (2013.01)

(58) Field of Classification Search
CPC ............ A63B 21/0058; A63B 21/0059; A63B 21/154; A63B 21/4034; A63B 21/227; A63B 24/0062; A63B 24/0087; A63B 2022/0682; A63B 2024/0068; A63B 2024/0093; A63B 2071/009; A63B 2220/51; A63B 2220/883; A63B 2225/09; A63B 2225/50; A63B 22/06; A63B 2022/0617–0652; A63B 21/00178; A63B 2024/0071; A63B 2071/025; A63B 2071/0694; A63B 2220/50; A63B 2220/10; A63B 2220/24; A63B 2220/34; A63B 2220/44; A63B 2220/62; A63B 2220/833; A63B 71/0622; A61H 1/0214; A61H 1/00
See application file for complete search history.

(56) References Cited

U.S. PATENT DOCUMENTS

| | | | |
|---|---|---|---|
| 446,671 | A | 2/1891 | Elliott |
| 610,157 | A | 8/1898 | Campbell |
| 631,276 | A | 8/1899 | Bulova |
| 823,712 | A | 6/1906 | Uhlmann |
| 1,149,029 | A | 8/1915 | Clark |
| 1,227,743 | A | 5/1917 | Burgedorff |
| 1,784,230 | A | 12/1930 | Freeman |
| 3,081,645 | A | 3/1963 | Bergfors |
| 3,100,640 | A | 8/1963 | Weitzel |
| 3,137,014 | A | 6/1964 | Meucci |
| 3,143,316 | A | 8/1964 | Shapiro |
| 3,713,438 | A | 1/1973 | Knutsen |
| 3,744,480 | A | 7/1973 | Gause et al. |
| 3,888,136 | A | 6/1975 | Lapeyre |
| 4,079,957 | A | 3/1978 | Blease |
| 4,408,613 | A | 10/1983 | Relyea |
| 4,436,097 | A | 3/1984 | Cunningham |
| 4,446,753 | A | 5/1984 | Nagano |
| 4,477,072 | A | 10/1984 | DeCloux |
| 4,499,900 | A | 2/1985 | Petrofsky et al. |
| 4,509,742 | A | 4/1985 | Cones |
| 4,606,241 | A | 8/1986 | Fredriksson |
| 4,611,807 | A | 9/1986 | Castillo |
| 4,616,823 | A | 10/1986 | Yang |
| 4,648,287 | A | 3/1987 | Preskitt |
| 4,673,178 | A | 6/1987 | Dwight |
| 4,822,032 | A | 4/1989 | Whitmore et al. |
| 4,824,104 | A | 4/1989 | Bloch |
| 4,850,245 | A | 7/1989 | Feamster et al. |
| 4,858,942 | A | 8/1989 | Rodriguez |
| 4,869,497 | A | 9/1989 | Stewart et al. |
| 4,915,374 | A | 4/1990 | Watkins |
| 4,930,768 | A | 6/1990 | Lapcevic |
| 4,932,650 | A | 6/1990 | Bingham et al. |
| 4,961,570 | A | 10/1990 | Chang |
| 5,137,501 | A | 8/1992 | Mertesdorf |
| 5,161,430 | A | 11/1992 | Febey |
| 5,202,794 | A | 4/1993 | Schnee et al. |
| 5,240,417 | A | 8/1993 | Smithson et al. |
| 5,247,853 | A | 9/1993 | Dalebout |
| 5,256,115 | A | 10/1993 | Scholder et al. |
| 5,256,117 | A | 10/1993 | Potts et al. |
| D342,299 | S | 12/1993 | Birrell et al. |
| 5,282,748 | A | 2/1994 | Little |
| 5,284,131 | A | 2/1994 | Gray |
| 5,316,532 | A | 5/1994 | Butler |
| 5,318,487 | A | 6/1994 | Golen |
| 5,324,241 | A | 6/1994 | Artigues et al. |
| 5,336,147 | A | 8/1994 | Sweeney, III |
| 5,338,272 | A | 8/1994 | Sweeney, III |
| 5,356,356 | A | 10/1994 | Hildebrandt |
| 5,361,649 | A | 11/1994 | Slocum, Jr. |
| D353,421 | S | 12/1994 | Gallivan |
| D359,777 | S | 6/1995 | Hildebrandt |
| 5,429,140 | A | 7/1995 | Burdea et al. |
| 5,458,022 | A | 10/1995 | Mattfeld et al. |
| 5,487,713 | A | 1/1996 | Butler |
| 5,566,589 | A | 10/1996 | Buck |
| 5,580,338 | A | 12/1996 | Scelta et al. |
| 5,676,349 | A | 10/1997 | Wilson |
| 5,685,804 | A | 11/1997 | Whan-Tong et al. |
| 5,738,636 | A | 4/1998 | Saringer et al. |
| 5,860,941 | A | 1/1999 | Saringer et al. |
| 5,950,813 | A | 9/1999 | Hoskins et al. |
| 6,007,459 | A | 12/1999 | Burgess |
| D421,075 | S | 2/2000 | Hildebrandt |
| 6,053,847 | A | 4/2000 | Stearns et al. |
| 6,077,201 | A | 6/2000 | Cheng |
| 6,102,834 | A | 8/2000 | Chen |
| 6,110,130 | A | 8/2000 | Kramer |
| 6,155,958 | A | 12/2000 | Goldberg |
| 6,162,189 | A | 12/2000 | Girone et al. |
| 6,182,029 | B1 | 1/2001 | Friedman |
| D438,580 | S | 3/2001 | Shaw |
| 6,253,638 | B1 | 7/2001 | Bermudez |
| 6,267,735 | B1 | 7/2001 | Blanchard et al. |
| 6,273,863 | B1 | 8/2001 | Avni et al. |
| D450,100 | S | 11/2001 | Hsu |
| D450,101 | S | 11/2001 | Hsu |
| D451,972 | S | 12/2001 | Easley |
| D452,285 | S | 12/2001 | Easley |
| D454,605 | S | 3/2002 | Lee |
| 6,371,891 | B1 | 4/2002 | Speas |
| D459,776 | S | 7/2002 | Lee |
| 6,413,190 | B1 | 7/2002 | Wood et al. |
| 6,430,436 | B1 | 8/2002 | Richter |
| 6,436,058 | B1 | 8/2002 | Krahner et al. |
| 6,450,923 | B1 | 9/2002 | Vatti |
| 6,474,193 | B1 | 11/2002 | Farney |
| 6,491,649 | B1 | 12/2002 | Ombrellaro |
| 6,514,085 | B2 | 2/2003 | Slattery et al. |
| 6,535,861 | B1 | 3/2003 | OConnor et al. |
| 6,543,309 | B2 | 4/2003 | Heim |
| D475,424 | S | 6/2003 | Lee |
| 6,589,139 | B1 | 7/2003 | Butterworth |
| 6,601,016 | B1 | 7/2003 | Brown et al. |
| 6,602,191 | B2 | 8/2003 | Quy |
| 6,613,000 | B1 | 9/2003 | Reinkensmeyer et al. |
| 6,626,800 | B1 | 9/2003 | Casler |
| 6,626,805 | B1 | 9/2003 | Lightbody |
| 6,640,122 | B2 | 10/2003 | Manoli |
| D482,416 | S | 11/2003 | Yang |
| 6,640,662 | B1 | 11/2003 | Baxter |
| 6,652,425 | B1 | 11/2003 | Martin et al. |
| D484,931 | S | 1/2004 | Tsai |

(56) References Cited

U.S. PATENT DOCUMENTS

| | | | | |
|---|---|---|---|---|
| 6,820,517 | B1 | 11/2004 | Farney | |
| 6,865,969 | B2 | 3/2005 | Stevens | |
| 6,890,312 | B1 | 5/2005 | Priester et al. | |
| 6,895,834 | B1 | 5/2005 | Baatz | |
| 6,902,513 | B1 | 6/2005 | McClure | |
| 7,058,453 | B2 | 6/2006 | Nelson et al. | |
| 7,063,643 | B2 | 6/2006 | Arai | |
| 7,156,665 | B1 | 1/2007 | OConnor et al. | |
| 7,156,780 | B1 | 1/2007 | Fuchs et al. | |
| 7,169,085 | B1 | 1/2007 | Killin et al. | |
| 7,204,788 | B2 | 4/2007 | Andrews | |
| 7,209,886 | B2 | 4/2007 | Kimmel | |
| 7,226,394 | B2 | 6/2007 | Johnson | |
| RE39,904 | E | 10/2007 | Lee | |
| 7,406,003 | B2 | 7/2008 | Burkhardt et al. | |
| D575,836 | S | 8/2008 | Hsiao | |
| 7,507,188 | B2 * | 3/2009 | Nurre | A63B 22/0605 482/57 |
| 7,594,879 | B2 | 9/2009 | Johnson | |
| 7,628,730 | B1 | 12/2009 | Watterson et al. | |
| D610,635 | S | 2/2010 | Hildebrandt | |
| 7,778,851 | B2 | 8/2010 | Schoenberg et al. | |
| 7,809,601 | B2 | 10/2010 | Shaya et al. | |
| 7,815,551 | B2 | 10/2010 | Merli | |
| 7,833,135 | B2 | 11/2010 | Radow et al. | |
| 7,837,472 | B1 | 11/2010 | Elsmore et al. | |
| 7,955,219 | B2 | 6/2011 | Birrell et al. | |
| 7,969,315 | B1 | 6/2011 | Ross et al. | |
| 7,988,599 | B2 | 8/2011 | Ainsworth et al. | |
| 8,012,107 | B2 | 9/2011 | Einav et al. | |
| 8,021,270 | B2 | 9/2011 | D'Eredita | |
| 8,038,578 | B2 | 10/2011 | Olrik et al. | |
| 8,079,937 | B2 * | 12/2011 | Bedell | A63B 22/001 482/4 |
| 8,113,991 | B2 | 2/2012 | Kutliroff | |
| 8,177,732 | B2 | 5/2012 | Einav et al. | |
| 8,287,434 | B2 | 10/2012 | Zavadsky et al. | |
| 8,298,123 | B2 | 10/2012 | Hickman | |
| 8,371,990 | B2 | 2/2013 | Shea | |
| 8,419,593 | B2 | 4/2013 | Ainsworth et al. | |
| 8,465,398 | B2 | 6/2013 | Lee et al. | |
| 8,506,458 | B2 | 8/2013 | Dugan | |
| 8,515,777 | B1 | 8/2013 | Rajasenan | |
| 8,540,515 | B2 | 9/2013 | Williams et al. | |
| 8,540,516 | B2 | 9/2013 | Williams et al. | |
| 8,556,778 | B1 | 10/2013 | Dugan | |
| 8,607,465 | B1 | 12/2013 | Edwards | |
| 8,613,689 | B2 | 12/2013 | Dyer et al. | |
| 8,672,812 | B2 | 3/2014 | Dugan | |
| 8,751,264 | B2 | 6/2014 | Beraja et al. | |
| 8,784,273 | B2 | 7/2014 | Dugan | |
| 8,823,448 | B1 | 9/2014 | Shen | |
| 8,845,493 | B2 | 9/2014 | Watterson et al. | |
| 8,849,681 | B2 | 9/2014 | Hargrove et al. | |
| 8,864,628 | B2 * | 10/2014 | Boyette | A63B 71/0619 482/901 |
| 8,893,287 | B2 | 11/2014 | Gjonej et al. | |
| 8,911,327 | B1 | 12/2014 | Boyette | |
| 8,979,711 | B2 | 3/2015 | Dugan | |
| 9,004,598 | B2 | 4/2015 | Weber | |
| 9,044,630 | B1 | 6/2015 | Lampert et al. | |
| 9,167,281 | B2 | 10/2015 | Petrov et al. | |
| D744,050 | S | 11/2015 | Colburn | |
| 9,248,071 | B1 * | 2/2016 | Benda | A63B 71/0009 |
| 9,272,185 | B2 | 3/2016 | Dugan | |
| 9,283,434 | B1 * | 3/2016 | Wu | A61B 5/6895 |
| 9,311,789 | B1 | 4/2016 | Gwin | |
| 9,312,907 | B2 | 4/2016 | Auchinleck et al. | |
| 9,367,668 | B2 | 6/2016 | Flynt et al. | |
| 9,409,054 | B2 | 8/2016 | Dugan | |
| 9,443,205 | B2 | 9/2016 | Wall | |
| 9,474,935 | B2 | 10/2016 | Abbondanza et al. | |
| 9,480,873 | B2 | 11/2016 | Chuang | |
| 9,481,428 | B2 * | 11/2016 | Gros | B62J 45/415 |
| 9,514,277 | B2 | 12/2016 | Hassing et al. | |
| 9,566,472 | B2 | 2/2017 | Dugan | |
| 9,579,056 | B2 | 2/2017 | Rosenbek et al. | |
| 9,629,558 | B2 | 4/2017 | Yuen et al. | |
| 9,640,057 | B1 | 5/2017 | Ross | |
| 9,707,147 | B2 | 7/2017 | Levital et al. | |
| 9,713,744 | B2 | 7/2017 | Suzuki | |
| D793,494 | S | 8/2017 | Mansfield et al. | |
| D794,142 | S | 8/2017 | Zhou | |
| 9,717,947 | B2 * | 8/2017 | Lin | A63B 23/0458 |
| 9,737,761 | B1 | 8/2017 | Govindarajan | |
| 9,757,612 | B2 | 9/2017 | Weber | |
| 9,782,621 | B2 | 10/2017 | Chiang et al. | |
| 9,802,076 | B2 * | 10/2017 | Murray | A63B 21/0058 |
| 9,802,081 | B2 | 10/2017 | Ridgel et al. | |
| 9,813,239 | B2 | 11/2017 | Chee et al. | |
| 9,827,445 | B2 | 11/2017 | Marcos et al. | |
| 9,849,337 | B2 | 12/2017 | Roman et al. | |
| 9,868,028 | B2 | 1/2018 | Shin | |
| 9,872,087 | B2 | 1/2018 | DelloStritto et al. | |
| 9,872,637 | B2 | 1/2018 | Kording et al. | |
| 9,914,053 | B2 | 3/2018 | Dugan | |
| 9,919,198 | B2 | 3/2018 | Romeo et al. | |
| 9,937,382 | B2 | 4/2018 | Dugan | |
| 9,939,784 | B1 | 4/2018 | Berardinelli | |
| 9,977,587 | B2 | 5/2018 | Mountain | |
| 9,993,181 | B2 | 6/2018 | Ross | |
| 10,004,946 | B2 | 6/2018 | Ross | |
| D826,349 | S | 8/2018 | Oblamski | |
| 10,055,550 | B2 | 8/2018 | Goetz | |
| 10,058,473 | B2 | 8/2018 | Oshima et al. | |
| 10,074,148 | B2 | 9/2018 | Cashman et al. | |
| 10,089,443 | B2 | 10/2018 | Miller et al. | |
| 10,111,643 | B2 | 10/2018 | Shulhauser et al. | |
| 10,137,328 | B2 | 11/2018 | Baudhuin | |
| 10,143,395 | B2 | 12/2018 | Chakravarthy et al. | |
| 10,155,134 | B2 | 12/2018 | Dugan | |
| 10,159,872 | B2 | 12/2018 | Sasaki et al. | |
| 10,173,094 | B2 * | 1/2019 | Gomberg | A63B 69/16 |
| 10,173,095 | B2 | 1/2019 | Gomberg et al. | |
| 10,173,096 | B2 | 1/2019 | Gomberg et al. | |
| 10,173,097 | B2 | 1/2019 | Gomberg et al. | |
| 10,198,928 | B1 | 2/2019 | Ross et al. | |
| 10,226,663 | B2 | 3/2019 | Gomberg et al. | |
| 10,231,664 | B2 | 3/2019 | Ganesh | |
| 10,244,990 | B2 | 4/2019 | Hu et al. | |
| 10,258,823 | B2 | 4/2019 | Cole | |
| 10,325,070 | B2 | 6/2019 | Beale et al. | |
| 10,327,697 | B1 | 6/2019 | Stein et al. | |
| 10,369,021 | B2 | 8/2019 | Zoss et al. | |
| 10,380,866 | B1 | 8/2019 | Ross et al. | |
| 10,413,238 | B1 | 9/2019 | Cooper | |
| 10,424,033 | B2 | 9/2019 | Romeo | |
| 10,430,552 | B2 | 10/2019 | Mihai | |
| D866,957 | S | 11/2019 | Ross et al. | |
| 10,468,131 | B2 | 11/2019 | Macoviak et al. | |
| 10,475,323 | B1 | 11/2019 | Ross | |
| 10,475,537 | B2 | 11/2019 | Purdie et al. | |
| 10,492,977 | B2 | 12/2019 | Kapure et al. | |
| 10,507,358 | B2 | 12/2019 | Kinnunen et al. | |
| 10,542,914 | B2 | 1/2020 | Forth et al. | |
| 10,546,467 | B1 | 1/2020 | Luciano, Jr. et al. | |
| 10,569,122 | B2 | 2/2020 | Johnson | |
| 10,572,626 | B2 | 2/2020 | Balram | |
| 10,576,331 | B2 | 3/2020 | Kuo | |
| 10,581,896 | B2 | 3/2020 | Nachenberg | |
| 10,625,114 | B2 | 4/2020 | Ercanbrack | |
| 10,646,746 | B1 | 5/2020 | Gomberg et al. | |
| 10,660,534 | B2 | 5/2020 | Lee et al. | |
| 10,678,890 | B2 | 6/2020 | Bitran et al. | |
| 10,685,092 | B2 | 6/2020 | Paparella et al. | |
| 10,777,200 | B2 | 9/2020 | Will et al. | |
| D899,605 | S | 10/2020 | Ross et al. | |
| 10,792,495 | B2 | 10/2020 | Izvorski et al. | |
| 10,867,695 | B2 | 12/2020 | Neagle | |
| 10,874,905 | B2 | 12/2020 | Belson et al. | |
| D907,143 | S | 1/2021 | Ach et al. | |
| 10,881,911 | B2 | 1/2021 | Kwon et al. | |
| 10,918,332 | B2 | 2/2021 | Belson et al. | |
| 10,931,643 | B1 | 2/2021 | Neumann | |

(56) References Cited

U.S. PATENT DOCUMENTS

| | | | |
|---|---|---|---|
| 10,987,176 | B2 | 4/2021 | Poltaretskyi et al. |
| 10,991,463 | B2 | 4/2021 | Kutzko et al. |
| 11,000,735 | B2 | 5/2021 | Orady et al. |
| 11,040,238 | B2 | 6/2021 | Colburn |
| 11,045,709 | B2 | 6/2021 | Putnam |
| 11,065,170 | B2 | 7/2021 | Yang et al. |
| 11,065,527 | B2 | 7/2021 | Putnam |
| 11,069,436 | B2 | 7/2021 | Mason et al. |
| 11,071,597 | B2 | 7/2021 | Posnack et al. |
| 11,075,000 | B2 | 7/2021 | Mason et al. |
| D928,635 | S | 8/2021 | Hacking et al. |
| 11,087,865 | B2 | 8/2021 | Mason et al. |
| 11,101,028 | B2 | 8/2021 | Mason et al. |
| 11,107,591 | B1 | 8/2021 | Mason |
| 11,139,060 | B2 | 10/2021 | Mason et al. |
| 11,185,735 | B2 | 11/2021 | Arn et al. |
| D939,096 | S | 12/2021 | Lee |
| D939,644 | S | 12/2021 | Ach et al. |
| D940,797 | S | 1/2022 | Ach et al. |
| D940,891 | S | 1/2022 | Lee |
| 11,229,727 | B2 | 1/2022 | Tatonetti |
| 11,270,795 | B2 | 3/2022 | Mason et al. |
| 11,272,879 | B2 | 3/2022 | Wiedenhoefer et al. |
| 11,278,766 | B2 | 3/2022 | Lee |
| 11,282,599 | B2 | 3/2022 | Mason et al. |
| 11,282,604 | B2 | 3/2022 | Mason et al. |
| 11,282,608 | B2 | 3/2022 | Mason et al. |
| 11,284,797 | B2 | 3/2022 | Mason et al. |
| D948,639 | S | 4/2022 | Ach et al. |
| 11,295,848 | B2 | 4/2022 | Mason et al. |
| 11,298,284 | B2 | 4/2022 | Bayerlein |
| 11,309,085 | B2 | 4/2022 | Mason et al. |
| 11,317,975 | B2 | 5/2022 | Mason et al. |
| 11,325,005 | B2 | 5/2022 | Mason et al. |
| 11,328,807 | B2 | 5/2022 | Mason et al. |
| 11,337,648 | B2 | 5/2022 | Mason |
| 11,348,683 | B2 | 5/2022 | Guaneri et al. |
| 11,376,470 | B2 | 7/2022 | Weldemariam |
| 11,404,150 | B2 | 8/2022 | Guaneri et al. |
| 11,410,768 | B2 | 8/2022 | Mason et al. |
| 11,422,841 | B2 | 8/2022 | Jeong |
| 11,495,355 | B2 | 11/2022 | McNutt et al. |
| 11,508,258 | B2 | 11/2022 | Nakashima et al. |
| 11,508,482 | B2 | 11/2022 | Mason et al. |
| 11,515,021 | B2 | 11/2022 | Mason |
| 11,515,028 | B2 | 11/2022 | Mason |
| 11,524,210 | B2 | 12/2022 | Kim et al. |
| 11,527,326 | B2 | 12/2022 | McNair et al. |
| 11,532,402 | B2 | 12/2022 | Farley et al. |
| 11,534,654 | B2 | 12/2022 | Silcock et al. |
| D976,339 | S | 1/2023 | Li |
| 11,541,274 | B2 | 1/2023 | Hacking |
| 11,636,944 | B2 | 4/2023 | Hanrahan et al. |
| 11,663,673 | B2 | 5/2023 | Pyles |
| 11,701,548 | B2 | 7/2023 | Posnack et al. |
| 2001/0044573 | A1 | 11/2001 | Manoli |
| 2002/0072452 | A1 | 6/2002 | Torkelson |
| 2002/0143279 | A1 | 10/2002 | Porter et al. |
| 2002/0160883 | A1 | 10/2002 | Dugan |
| 2002/0183599 | A1 | 12/2002 | Castellanos |
| 2003/0013072 | A1 | 1/2003 | Thomas |
| 2003/0036683 | A1 | 2/2003 | Kehr et al. |
| 2003/0045402 | A1 | 3/2003 | Pyle |
| 2003/0064863 | A1 | 4/2003 | Chen |
| 2003/0083596 | A1 | 5/2003 | Kramer et al. |
| 2003/0092536 | A1 | 5/2003 | Romanelli et al. |
| 2003/0109814 | A1 | 6/2003 | Rummerfield |
| 2003/0181832 | A1 | 9/2003 | Carnahan et al. |
| 2004/0102931 | A1 | 5/2004 | Ellis et al. |
| 2004/0106502 | A1 | 6/2004 | Sher |
| 2004/0147969 | A1 | 7/2004 | Mann et al. |
| 2004/0172093 | A1 | 9/2004 | Rummerfield |
| 2004/0194572 | A1 | 10/2004 | Kim |
| 2004/0204959 | A1 | 10/2004 | Moreano et al. |
| 2005/0015118 | A1 | 1/2005 | Davis et al. |
| 2005/0020411 | A1 | 1/2005 | Andrews |
| 2005/0043153 | A1 | 2/2005 | Krietzman |
| 2005/0049122 | A1 | 3/2005 | Vallone et al. |
| 2005/0085346 | A1 | 4/2005 | Johnson |
| 2005/0085353 | A1 | 4/2005 | Johnson |
| 2005/0115561 | A1 | 6/2005 | Stahmann |
| 2005/0274220 | A1 | 12/2005 | Reboullet |
| 2006/0003871 | A1 | 1/2006 | Houghton et al. |
| 2006/0046905 | A1 | 3/2006 | Doody et al. |
| 2006/0058648 | A1 | 3/2006 | Meier |
| 2006/0064136 | A1 | 3/2006 | Wang |
| 2006/0064329 | A1 | 3/2006 | Abolfathi et al. |
| 2006/0199700 | A1 | 9/2006 | LaStayo et al. |
| 2006/0247095 | A1 | 11/2006 | Rummerfield |
| 2007/0042868 | A1 | 2/2007 | Fisher et al. |
| 2007/0118389 | A1 | 5/2007 | Shipon |
| 2007/0137307 | A1 | 6/2007 | Gruben et al. |
| 2007/0173392 | A1 | 7/2007 | Stanford |
| 2007/0184414 | A1 | 8/2007 | Perez |
| 2007/0194939 | A1 | 8/2007 | Alvarez et al. |
| 2007/0219059 | A1 | 9/2007 | Schwartz |
| 2007/0287597 | A1 | 12/2007 | Cameron |
| 2008/0021834 | A1 | 1/2008 | Holla et al. |
| 2008/0082356 | A1 | 4/2008 | Friedlander et al. |
| 2008/0096726 | A1 | 4/2008 | Riley et al. |
| 2008/0153592 | A1 | 6/2008 | James-Herbert |
| 2008/0161166 | A1 | 7/2008 | Lo |
| 2008/0161733 | A1 | 7/2008 | Einav et al. |
| 2008/0281633 | A1 | 11/2008 | Burdea et al. |
| 2008/0300914 | A1 | 12/2008 | Karkanias et al. |
| 2009/0011907 | A1 | 1/2009 | Radow et al. |
| 2009/0058635 | A1 | 3/2009 | LaLonde et al. |
| 2009/0070138 | A1 | 3/2009 | Langheier et al. |
| 2009/0211395 | A1 | 8/2009 | Mule |
| 2009/0270227 | A1 | 10/2009 | Ashby et al. |
| 2009/0287503 | A1 | 11/2009 | Angell et al. |
| 2009/0299766 | A1 | 12/2009 | Friedlander et al. |
| 2010/0048358 | A1 | 2/2010 | Tchao et al. |
| 2010/0076786 | A1 | 3/2010 | Dalton et al. |
| 2010/0121160 | A1 | 5/2010 | Stark et al. |
| 2010/0173747 | A1 | 7/2010 | Chen et al. |
| 2010/0216168 | A1 | 8/2010 | Heinzman et al. |
| 2010/0248899 | A1 | 9/2010 | Bedell et al. |
| 2010/0248905 | A1 | 9/2010 | Lu |
| 2010/0268304 | A1 | 10/2010 | Matos |
| 2010/0298102 | A1 | 11/2010 | Bosecker et al. |
| 2010/0326207 | A1 | 12/2010 | Topel |
| 2011/0010188 | A1 | 1/2011 | Yoshikawa et al. |
| 2011/0047108 | A1 | 2/2011 | Chakrabarty et al. |
| 2011/0119212 | A1 | 5/2011 | De Bruin et al. |
| 2011/0172059 | A1 | 7/2011 | Watterson et al. |
| 2011/0195819 | A1 | 8/2011 | Shaw et al. |
| 2011/0218814 | A1 | 9/2011 | Coats |
| 2011/0275483 | A1 | 11/2011 | Dugan |
| 2011/0306846 | A1 | 12/2011 | Osorio |
| 2012/0041771 | A1 | 2/2012 | Cosentino et al. |
| 2012/0065987 | A1 | 3/2012 | Farooq et al. |
| 2012/0116258 | A1 | 5/2012 | Lee |
| 2012/0167709 | A1 | 7/2012 | Chen et al. |
| 2012/0183939 | A1 | 7/2012 | Aragones et al. |
| 2012/0190502 | A1 | 7/2012 | Paulus et al. |
| 2012/0232438 | A1 | 9/2012 | Cataldi et al. |
| 2012/0259648 | A1 | 10/2012 | Mallon et al. |
| 2012/0295240 | A1 | 11/2012 | Walker et al. |
| 2012/0296455 | A1 | 11/2012 | Ohnemus et al. |
| 2012/0310667 | A1 | 12/2012 | Altman et al. |
| 2013/0123071 | A1 | 5/2013 | Rhea |
| 2013/0123667 | A1 | 5/2013 | Komatireddy et al. |
| 2013/0137550 | A1 | 5/2013 | Skinner et al. |
| 2013/0178334 | A1 | 7/2013 | Brammer |
| 2013/0211281 | A1 | 8/2013 | Ross et al. |
| 2013/0253943 | A1 | 9/2013 | Lee et al. |
| 2013/0274069 | A1 | 10/2013 | Watterson et al. |
| 2013/0296987 | A1 | 11/2013 | Rogers et al. |
| 2013/0318027 | A1 | 11/2013 | Almogy et al. |
| 2013/0332616 | A1 | 12/2013 | Landwehr |
| 2013/0345025 | A1 * | 12/2013 | van der Merwe . A63B 22/0605 482/7 |
| 2014/0006042 | A1 | 1/2014 | Keefe et al. |

(56) References Cited

U.S. PATENT DOCUMENTS

| | | | |
|---|---|---|---|
| 2014/0011640 | A1 | 1/2014 | Dugan |
| 2014/0089836 | A1 | 3/2014 | Damani et al. |
| 2014/0113768 | A1 | 4/2014 | Lin et al. |
| 2014/0155129 | A1 | 6/2014 | Dugan |
| 2014/0172442 | A1 | 6/2014 | Broderick |
| 2014/0172460 | A1 | 6/2014 | Kohli |
| 2014/0188009 | A1 | 7/2014 | Lange et al. |
| 2014/0194250 | A1 | 7/2014 | Reich et al. |
| 2014/0194251 | A1 | 7/2014 | Reich et al. |
| 2014/0207264 | A1 | 7/2014 | Quy |
| 2014/0207486 | A1 | 7/2014 | Carty et al. |
| 2014/0228649 | A1 | 8/2014 | Rayner et al. |
| 2014/0246499 | A1 | 9/2014 | Proud et al. |
| 2014/0256511 | A1 | 9/2014 | Smith |
| 2014/0257837 | A1 | 9/2014 | Walker et al. |
| 2014/0274565 | A1 | 9/2014 | Boyette et al. |
| 2014/0274622 | A1 | 9/2014 | Leonhard |
| 2014/0303540 | A1 | 10/2014 | Baym |
| 2014/0309083 | A1 | 10/2014 | Dugan |
| 2014/0322686 | A1 | 10/2014 | Kang |
| 2014/0371816 | A1 | 12/2014 | Matos |
| 2015/0025816 | A1 | 1/2015 | Ross |
| 2015/0045700 | A1 | 2/2015 | Cavanagh et al. |
| 2015/0073814 | A1 | 3/2015 | Linebaugh |
| 2015/0088544 | A1 | 3/2015 | Goldberg |
| 2015/0094192 | A1 | 4/2015 | Skwortsow et al. |
| 2015/0099458 | A1 | 4/2015 | Weisner et al. |
| 2015/0099952 | A1 | 4/2015 | Lain et al. |
| 2015/0112230 | A1 | 4/2015 | Iglesias |
| 2015/0130830 | A1 | 5/2015 | Nagasaki |
| 2015/0141200 | A1 | 5/2015 | Murray et al. |
| 2015/0149217 | A1 | 5/2015 | Kaburagi |
| 2015/0151162 | A1 | 6/2015 | Dugan |
| 2015/0158549 | A1 | 6/2015 | Gros et al. |
| 2015/0161331 | A1 | 6/2015 | Oleynik |
| 2015/0196805 | A1 | 7/2015 | Koduri |
| 2015/0257679 | A1 | 9/2015 | Ross |
| 2015/0265209 | A1 | 9/2015 | Zhang |
| 2015/0290061 | A1 | 10/2015 | Stafford et al. |
| 2015/0339442 | A1 | 11/2015 | Oleynik |
| 2015/0341812 | A1 | 11/2015 | Dion et al. |
| 2015/0351664 | A1 | 12/2015 | Ross |
| 2015/0351665 | A1 | 12/2015 | Ross |
| 2015/0360069 | A1 | 12/2015 | Marti et al. |
| 2015/0379232 | A1 | 12/2015 | Mainwaring et al. |
| 2015/0379430 | A1 | 12/2015 | Dirac et al. |
| 2016/0007885 | A1 | 1/2016 | Basta |
| 2016/0023081 | A1 | 1/2016 | Popa-Simil et al. |
| 2016/0045170 | A1 | 2/2016 | Migita |
| 2016/0096073 | A1 | 4/2016 | Rahman et al. |
| 2016/0117471 | A1 | 4/2016 | Belt et al. |
| 2016/0140319 | A1 | 5/2016 | Stark |
| 2016/0143593 | A1 | 5/2016 | Fu et al. |
| 2016/0151670 | A1 | 6/2016 | Dugan |
| 2016/0166833 | A1 | 6/2016 | Bum |
| 2016/0166881 | A1 | 6/2016 | Ridgel et al. |
| 2016/0193306 | A1 | 7/2016 | Rabovsky et al. |
| 2016/0213924 | A1 | 7/2016 | Coleman |
| 2016/0275259 | A1 | 9/2016 | Nolan et al. |
| 2016/0287166 | A1 | 10/2016 | Tran |
| 2016/0302721 | A1 | 10/2016 | Wiedenhoefer et al. |
| 2016/0317869 | A1 | 11/2016 | Dugan |
| 2016/0322078 | A1 | 11/2016 | Bose et al. |
| 2016/0325140 | A1 | 11/2016 | Wu |
| 2016/0332028 | A1 | 11/2016 | Melnik |
| 2016/0354636 | A1 | 12/2016 | Jang |
| 2016/0361597 | A1 | 12/2016 | Cole et al. |
| 2016/0373477 | A1 | 12/2016 | Moyle |
| 2017/0004260 | A1 | 1/2017 | Moturu et al. |
| 2017/0014671 | A1 | 1/2017 | Bums, Sr. |
| 2017/0033375 | A1 | 2/2017 | Ohmori et al. |
| 2017/0042467 | A1 | 2/2017 | Herr et al. |
| 2017/0046488 | A1 | 2/2017 | Pereira |
| 2017/0065851 | A1 | 3/2017 | Deluca et al. |
| 2017/0080320 | A1 | 3/2017 | Smith |
| 2017/0095670 | A1 | 4/2017 | Ghaffari et al. |
| 2017/0095692 | A1 | 4/2017 | Chang et al. |
| 2017/0095693 | A1 | 4/2017 | Chang et al. |
| 2017/0100637 | A1 | 4/2017 | Princen et al. |
| 2017/0106242 | A1 | 4/2017 | Dugan |
| 2017/0113092 | A1 | 4/2017 | Johnson |
| 2017/0128769 | A1 | 5/2017 | Long et al. |
| 2017/0132947 | A1 | 5/2017 | Maeda et al. |
| 2017/0136296 | A1 | 5/2017 | Barrera et al. |
| 2017/0143261 | A1 | 5/2017 | Wiedenhoefer et al. |
| 2017/0147752 | A1 | 5/2017 | Toru |
| 2017/0147789 | A1 | 5/2017 | Wiedenhoefer et al. |
| 2017/0148297 | A1 | 5/2017 | Ross |
| 2017/0168555 | A1 | 6/2017 | Munoz et al. |
| 2017/0181698 | A1 | 6/2017 | Wiedenhoefer et al. |
| 2017/0190052 | A1 | 7/2017 | Jaekel et al. |
| 2017/0202724 | A1 | 7/2017 | De Rossi |
| 2017/0209766 | A1 | 7/2017 | Riley et al. |
| 2017/0220751 | A1 | 8/2017 | Davis |
| 2017/0235882 | A1 | 8/2017 | Orlov et al. |
| 2017/0235906 | A1 | 8/2017 | Dorris et al. |
| 2017/0243028 | A1 | 8/2017 | LaFever et al. |
| 2017/0262604 | A1 | 9/2017 | Francois |
| 2017/0265800 | A1 | 9/2017 | Auchinleck et al. |
| 2017/0266501 | A1 | 9/2017 | Sanders et al. |
| 2017/0270260 | A1 | 9/2017 | Shetty |
| 2017/0278209 | A1 | 9/2017 | Olsen et al. |
| 2017/0282015 | A1 | 10/2017 | Wicks et al. |
| 2017/0283508 | A1 | 10/2017 | Demopulos et al. |
| 2017/0286621 | A1 | 10/2017 | Cox |
| 2017/0300654 | A1 | 10/2017 | Stein et al. |
| 2017/0304024 | A1 | 10/2017 | Nobrega |
| 2017/0312614 | A1 | 11/2017 | Tran et al. |
| 2017/0323481 | A1 | 11/2017 | Tran et al. |
| 2017/0329917 | A1 | 11/2017 | McRaith et al. |
| 2017/0329933 | A1 | 11/2017 | Brust |
| 2017/0333755 | A1 | 11/2017 | Rider |
| 2017/0337033 | A1 | 11/2017 | Duyan et al. |
| 2017/0337334 | A1 | 11/2017 | Stanczak |
| 2017/0344726 | A1 | 11/2017 | Duffy et al. |
| 2017/0347923 | A1 | 12/2017 | Roh |
| 2017/0360586 | A1 | 12/2017 | Dempers et al. |
| 2017/0368413 | A1 | 12/2017 | Shavit |
| 2018/0017806 | A1 | 1/2018 | Wang et al. |
| 2018/0036593 | A1 | 2/2018 | Ridgel et al. |
| 2018/0052962 | A1 | 2/2018 | Van Der Koijk et al. |
| 2018/0056104 | A1 | 3/2018 | Cromie et al. |
| 2018/0060494 | A1 | 3/2018 | Dias et al. |
| 2018/0071565 | A1 | 3/2018 | Gomberg et al. |
| 2018/0071566 | A1 | 3/2018 | Gomberg et al. |
| 2018/0071569 | A1 | 3/2018 | Gomberg et al. |
| 2018/0071570 | A1 | 3/2018 | Gomberg et al. |
| 2018/0071571 | A1 | 3/2018 | Gomberg et al. |
| 2018/0071572 | A1 | 3/2018 | Gomberg et al. |
| 2018/0075205 | A1 | 3/2018 | Moturu et al. |
| 2018/0078843 | A1 | 3/2018 | Tran et al. |
| 2018/0085615 | A1 | 3/2018 | Astolfi et al. |
| 2018/0096111 | A1 | 4/2018 | Wells et al. |
| 2018/0102190 | A1 | 4/2018 | Hogue et al. |
| 2018/0116741 | A1 | 5/2018 | Garcia Kilroy et al. |
| 2018/0140927 | A1 | 5/2018 | Kito |
| 2018/0146870 | A1 | 5/2018 | Shemesh |
| 2018/0177612 | A1 | 6/2018 | Trabish et al. |
| 2018/0178061 | A1 | 6/2018 | O'Larte et al. |
| 2018/0199855 | A1 | 7/2018 | Odame et al. |
| 2018/0200577 | A1 | 7/2018 | Dugan |
| 2018/0220935 | A1 | 8/2018 | Tadano et al. |
| 2018/0228682 | A1 | 8/2018 | Bayerlein et al. |
| 2018/0240552 | A1 | 8/2018 | Tuyl et al. |
| 2018/0253991 | A1 | 9/2018 | Tang et al. |
| 2018/0256079 | A1 | 9/2018 | Yang et al. |
| 2018/0263530 | A1 | 9/2018 | Jung |
| 2018/0263535 | A1 | 9/2018 | Cramer |
| 2018/0263552 | A1 | 9/2018 | Graman et al. |
| 2018/0264312 | A1 | 9/2018 | Pompile et al. |
| 2018/0271432 | A1 | 9/2018 | Auchinleck et al. |
| 2018/0272184 | A1 | 9/2018 | Vassilaros et al. |
| 2018/0280784 | A1 | 10/2018 | Romeo et al. |
| 2018/0296143 | A1 | 10/2018 | Anderson et al. |

(56) References Cited

U.S. PATENT DOCUMENTS

| | | | |
|---|---|---|---|
| 2018/0296157 | A1 | 10/2018 | Bleich et al. |
| 2018/0326243 | A1 | 11/2018 | Badi et al. |
| 2018/0330058 | A1 | 11/2018 | Bates |
| 2018/0330810 | A1 | 11/2018 | Gamarnik |
| 2018/0330824 | A1 | 11/2018 | Athey et al. |
| 2018/0290017 | A1 | 12/2018 | Fung |
| 2018/0353812 | A1 | 12/2018 | Lannon et al. |
| 2018/0360340 | A1 | 12/2018 | Rehse et al. |
| 2018/0373844 | A1 | 12/2018 | Ferrandez-Escamez et al. |
| 2019/0009135 | A1 | 1/2019 | Wu |
| 2019/0019163 | A1 | 1/2019 | Batey et al. |
| 2019/0019573 | A1 | 1/2019 | Lake et al. |
| 2019/0019578 | A1 | 1/2019 | Vaccaro |
| 2019/0030415 | A1 | 1/2019 | Volpe, Jr. |
| 2019/0031284 | A1 | 1/2019 | Fuchs |
| 2019/0046794 | A1 | 2/2019 | Goodall et al. |
| 2019/0060708 | A1 | 2/2019 | Fung |
| 2019/0065970 | A1 | 2/2019 | Bonutti et al. |
| 2019/0066832 | A1 | 2/2019 | Kang et al. |
| 2019/0076701 | A1 | 3/2019 | Dugan |
| 2019/0080802 | A1 | 3/2019 | Ziobro et al. |
| 2019/0088356 | A1 | 3/2019 | Oliver et al. |
| 2019/0090744 | A1 | 3/2019 | Mahfouz |
| 2019/0091506 | A1 | 3/2019 | Gatelli et al. |
| 2019/0111299 | A1 | 4/2019 | Radcliffe et al. |
| 2019/0115097 | A1 | 4/2019 | Macoviak et al. |
| 2019/0118038 | A1 | 4/2019 | Tana et al. |
| 2019/0126099 | A1 | 5/2019 | Hoang |
| 2019/0132948 | A1 | 5/2019 | Longinotti-Buitoni et al. |
| 2019/0134454 | A1 | 5/2019 | Mahoney et al. |
| 2019/0137988 | A1 | 5/2019 | Cella et al. |
| 2019/0167988 | A1 | 6/2019 | Shahriari et al. |
| 2019/0172587 | A1 | 6/2019 | Park et al. |
| 2019/0175988 | A1 | 6/2019 | Volterrani et al. |
| 2019/0183715 | A1 | 6/2019 | Kapure et al. |
| 2019/0200920 | A1 | 7/2019 | Tien et al. |
| 2019/0209891 | A1 | 7/2019 | Fung |
| 2019/0223797 | A1 | 7/2019 | Tran |
| 2019/0228856 | A1 | 7/2019 | Leifer |
| 2019/0240103 | A1 | 8/2019 | Hepler et al. |
| 2019/0240541 | A1 | 8/2019 | Denton et al. |
| 2019/0244540 | A1 | 8/2019 | Errante et al. |
| 2019/0251456 | A1 | 8/2019 | Constantin |
| 2019/0262084 | A1 | 8/2019 | Roh |
| 2019/0269343 | A1 | 9/2019 | Ramos Murguialday et al. |
| 2019/0274523 | A1 | 9/2019 | Bates et al. |
| 2019/0275368 | A1 | 9/2019 | Maroldi |
| 2019/0304584 | A1 | 10/2019 | Savolainen |
| 2019/0307983 | A1 | 10/2019 | Goldman |
| 2019/0314681 | A1 | 10/2019 | Yang |
| 2019/0344123 | A1 | 11/2019 | Rubin et al. |
| 2019/0354632 | A1 | 11/2019 | Mital et al. |
| 2019/0362242 | A1 | 11/2019 | Pillai et al. |
| 2019/0366146 | A1 | 12/2019 | Tong et al. |
| 2019/0388728 | A1 | 12/2019 | Wang et al. |
| 2020/0005928 | A1 | 1/2020 | Daniel |
| 2020/0038703 | A1 | 2/2020 | Cleary et al. |
| 2020/0051446 | A1 | 2/2020 | Rubinstein et al. |
| 2020/0066390 | A1 | 2/2020 | Svendrys et al. |
| 2020/0085300 | A1 | 3/2020 | Kwatra et al. |
| 2020/0093418 | A1 | 3/2020 | Kluger et al. |
| 2020/0143922 | A1 | 5/2020 | Chekroud et al. |
| 2020/0151595 | A1 | 5/2020 | Jayalath et al. |
| 2020/0151646 | A1 | 5/2020 | De La Fuente Sanchez |
| 2020/0152339 | A1 | 5/2020 | Pulitzer et al. |
| 2020/0160198 | A1 | 5/2020 | Reeves et al. |
| 2020/0170876 | A1 | 6/2020 | Kapure et al. |
| 2020/0176098 | A1 | 6/2020 | Lucas et al. |
| 2020/0197744 | A1 | 6/2020 | Schweighofer |
| 2020/0221975 | A1 | 7/2020 | Basta et al. |
| 2020/0237291 | A1 | 7/2020 | Raja |
| 2020/0267487 | A1 | 8/2020 | Siva |
| 2020/0275886 | A1 | 9/2020 | Mason |
| 2020/0289045 | A1 | 9/2020 | Hacking et al. |
| 2020/0289046 | A1 | 9/2020 | Hacking et al. |
| 2020/0289878 | A1 | 9/2020 | Am et al. |
| 2020/0289879 | A1 | 9/2020 | Hacking et al. |
| 2020/0289880 | A1 | 9/2020 | Hacking et al. |
| 2020/0289881 | A1 | 9/2020 | Hacking et al. |
| 2020/0289889 | A1 | 9/2020 | Hacking et al. |
| 2020/0293712 | A1 | 9/2020 | Potts et al. |
| 2020/0303063 | A1 | 9/2020 | Sharma et al. |
| 2020/0334972 | A1 | 10/2020 | Gopalakrishnan |
| 2020/0357299 | A1 | 11/2020 | Patel et al. |
| 2020/0365256 | A1 | 11/2020 | Hayashitani et al. |
| 2020/0395112 | A1 | 12/2020 | Ronner |
| 2020/0401224 | A1 | 12/2020 | Cotton |
| 2020/0410385 | A1 | 12/2020 | Otsuki |
| 2020/0411162 | A1 | 12/2020 | Lien et al. |
| 2021/0005224 | A1 | 1/2021 | Rothschild et al. |
| 2021/0005319 | A1 | 1/2021 | Otsuki et al. |
| 2021/0074178 | A1 | 3/2021 | Ilan et al. |
| 2021/0076981 | A1 | 3/2021 | Hacking et al. |
| 2021/0077860 | A1 | 3/2021 | Posnack et al. |
| 2021/0098129 | A1 | 4/2021 | Neumann |
| 2021/0101051 | A1 | 4/2021 | Posnack et al. |
| 2021/0113890 | A1 | 4/2021 | Posnack et al. |
| 2021/0127974 | A1 | 5/2021 | Mason et al. |
| 2021/0128080 | A1 | 5/2021 | Mason et al. |
| 2021/0128255 | A1 | 5/2021 | Mason et al. |
| 2021/0128978 | A1 | 5/2021 | Gilstrom et al. |
| 2021/0134412 | A1 | 5/2021 | Guaneri et al. |
| 2021/0134425 | A1 | 5/2021 | Mason et al. |
| 2021/0134427 | A1 | 5/2021 | Mason et al. |
| 2021/0134428 | A1 | 5/2021 | Mason et al. |
| 2021/0134430 | A1 | 5/2021 | Mason et al. |
| 2021/0134432 | A1 | 5/2021 | Mason et al. |
| 2021/0134456 | A1 | 5/2021 | Posnack et al. |
| 2021/0134457 | A1 | 5/2021 | Mason et al. |
| 2021/0134458 | A1 | 5/2021 | Mason et al. |
| 2021/0134463 | A1 | 5/2021 | Mason et al. |
| 2021/0138304 | A1 | 5/2021 | Mason et al. |
| 2021/0142875 | A1 | 5/2021 | Mason et al. |
| 2021/0142893 | A1 | 5/2021 | Guaneri et al. |
| 2021/0142898 | A1 | 5/2021 | Mason et al. |
| 2021/0142903 | A1 | 5/2021 | Mason et al. |
| 2021/0144074 | A1 | 5/2021 | Guaneri et al. |
| 2021/0186419 | A1 | 6/2021 | Van Ee et al. |
| 2021/0202090 | A1 | 7/2021 | ODonovan et al. |
| 2021/0202103 | A1 | 7/2021 | Bostic et al. |
| 2021/0245003 | A1 | 8/2021 | Turner |
| 2021/0251562 | A1 | 8/2021 | Jain |
| 2021/0272677 | A1 | 9/2021 | Barbee |
| 2021/0338469 | A1 | 11/2021 | Dempers |
| 2021/0343384 | A1 | 11/2021 | Purushothaman et al. |
| 2021/0345879 | A1 | 11/2021 | Mason et al. |
| 2021/0345975 | A1 | 11/2021 | Mason et al. |
| 2021/0350888 | A1 | 11/2021 | Guaneri et al. |
| 2021/0350898 | A1 | 11/2021 | Mason et al. |
| 2021/0350899 | A1 | 11/2021 | Mason et al. |
| 2021/0350901 | A1 | 11/2021 | Mason et al. |
| 2021/0350902 | A1 | 11/2021 | Mason et al. |
| 2021/0350914 | A1 | 11/2021 | Guaneri et al. |
| 2021/0350926 | A1 | 11/2021 | Mason et al. |
| 2021/0361514 | A1 | 11/2021 | Choi et al. |
| 2021/0366587 | A1 | 11/2021 | Mason et al. |
| 2021/0383909 | A1 | 12/2021 | Mason et al. |
| 2021/0391091 | A1 | 12/2021 | Mason |
| 2021/0398668 | A1 | 12/2021 | Chock et al. |
| 2021/0407670 | A1 | 12/2021 | Mason et al. |
| 2021/0407681 | A1 | 12/2021 | Mason et al. |
| 2022/0000556 | A1 | 1/2022 | Casey et al. |
| 2022/0015838 | A1 | 1/2022 | Posnack et al. |
| 2022/0016480 | A1 | 1/2022 | Bissonnette et al. |
| 2022/0016482 | A1 | 1/2022 | Bissonnette |
| 2022/0016485 | A1 | 1/2022 | Bissonnette et al. |
| 2022/0016486 | A1 | 1/2022 | Bissonnette |
| 2022/0020469 | A1 | 1/2022 | Tanner |
| 2022/0044806 | A1 | 2/2022 | Sanders et al. |
| 2022/0047921 | A1 | 2/2022 | Bissonnette et al. |
| 2022/0079690 | A1 | 3/2022 | Mason et al. |
| 2022/0080256 | A1 | 3/2022 | Arn et al. |
| 2022/0080265 | A1 | 3/2022 | Watterson |
| 2022/0105384 | A1 | 4/2022 | Hacking et al. |

(56) References Cited

U.S. PATENT DOCUMENTS

| | | | |
|---|---|---|---|
| 2022/0105385 | A1 | 4/2022 | Hacking et al. |
| 2022/0105390 | A1 | 4/2022 | Yuasa |
| 2022/0115133 | A1 | 4/2022 | Mason et al. |
| 2022/0118218 | A1 | 4/2022 | Bense et al. |
| 2022/0126169 | A1 | 4/2022 | Mason |
| 2022/0133576 | A1 | 5/2022 | Choi et al. |
| 2022/0148725 | A1 | 5/2022 | Mason et al. |
| 2022/0158916 | A1 | 5/2022 | Mason et al. |
| 2022/0176039 | A1 | 6/2022 | Lintereur et al. |
| 2022/0181004 | A1 | 6/2022 | Zilca et al. |
| 2022/0193491 | A1 | 6/2022 | Mason et al. |
| 2022/0230729 | A1 | 7/2022 | Mason et al. |
| 2022/0238223 | A1 | 7/2022 | Mason et al. |
| 2022/0262483 | A1 | 8/2022 | Rosenberg et al. |
| 2022/0262504 | A1 | 8/2022 | Bratty et al. |
| 2022/0266094 | A1 | 8/2022 | Mason et al. |
| 2022/0270738 | A1 | 8/2022 | Mason et al. |
| 2022/0273985 | A1 | 9/2022 | Jeong et al. |
| 2022/0273986 | A1 | 9/2022 | Mason |
| 2022/0288460 | A1 | 9/2022 | Mason |
| 2022/0288461 | A1 | 9/2022 | Ashley et al. |
| 2022/0288462 | A1 | 9/2022 | Ashley et al. |
| 2022/0293257 | A1 | 9/2022 | Guaneri et al. |
| 2022/0300787 | A1 | 9/2022 | Wall et al. |
| 2022/0304881 | A1 | 9/2022 | Choi et al. |
| 2022/0304882 | A1 | 9/2022 | Choi |
| 2022/0305328 | A1 | 9/2022 | Choi et al. |
| 2022/0314075 | A1 | 10/2022 | Mason et al. |
| 2022/0323826 | A1 | 10/2022 | Khurana |
| 2022/0327714 | A1 | 10/2022 | Cook et al. |
| 2022/0327807 | A1 | 10/2022 | Cook et al. |
| 2022/0328181 | A1 | 10/2022 | Mason et al. |
| 2022/0330823 | A1 | 10/2022 | Janssen |
| 2022/0331663 | A1 | 10/2022 | Mason |
| 2022/0338761 | A1 | 10/2022 | Maddahi et al. |
| 2022/0339052 | A1 | 10/2022 | Kim |
| 2022/0339501 | A1 | 10/2022 | Mason et al. |
| 2022/0384012 | A1 | 12/2022 | Mason |
| 2022/0392591 | A1 | 12/2022 | Guaneri et al. |
| 2022/0395232 | A1 | 12/2022 | Locke |
| 2022/0401783 | A1 | 12/2022 | Choi |
| 2022/0415469 | A1 | 12/2022 | Mason |
| 2022/0415471 | A1 | 12/2022 | Mason |
| 2023/0001268 | A1 | 1/2023 | Bissonnette et al. |
| 2023/0013530 | A1 | 1/2023 | Mason |
| 2023/0014598 | A1 | 1/2023 | Mason et al. |
| 2023/0029639 | A1 | 2/2023 | Roy |
| 2023/0048040 | A1 | 2/2023 | Hacking et al. |
| 2023/0051751 | A1 | 2/2023 | Hacking et al. |
| 2023/0058605 | A1 | 2/2023 | Mason |
| 2023/0060039 | A1 | 2/2023 | Mason |
| 2023/0072368 | A1 | 3/2023 | Mason |
| 2023/0078793 | A1 | 3/2023 | Mason |
| 2023/0119461 | A1 | 4/2023 | Mason |
| 2023/0190100 | A1 | 6/2023 | Stump |
| 2023/0201656 | A1 | 6/2023 | Hacking et al. |
| 2023/0207097 | A1 | 6/2023 | Mason |
| 2023/0207124 | A1 | 6/2023 | Walsh et al. |
| 2023/0215539 | A1 | 7/2023 | Rosenberg et al. |
| 2023/0215552 | A1 | 7/2023 | Khotilovich et al. |
| 2023/0245747 | A1 | 8/2023 | Rosenberg et al. |
| 2023/0245748 | A1 | 8/2023 | Rosenberg et al. |
| 2023/0245750 | A1 | 8/2023 | Rosenberg et al. |
| 2023/0245751 | A1 | 8/2023 | Rosenberg et al. |
| 2023/0253089 | A1 | 8/2023 | Rosenberg et al. |
| 2023/0255555 | A1 | 8/2023 | Sundaram et al. |
| 2023/0263428 | A1 | 8/2023 | Hull et al. |
| 2023/0274813 | A1 | 8/2023 | Rosenberg et al. |
| 2023/0282329 | A1 | 9/2023 | Mason et al. |
| 2023/0364472 | A1 | 11/2023 | Posnack |
| 2023/0368886 | A1 | 11/2023 | Rosenberg |
| 2023/0377711 | A1 | 11/2023 | Rosenberg |
| 2023/0377712 | A1 | 11/2023 | Rosenberg |
| 2023/0386639 | A1 | 11/2023 | Rosenberg |
| 2023/0395231 | A1 | 12/2023 | Rosenberg |
| 2023/0395232 | A1 | 12/2023 | Rosenberg |
| 2024/0029856 | A1 | 1/2024 | Rosenberg |

FOREIGN PATENT DOCUMENTS

| | | | |
|---|---|---|---|
| CN | 101964151 | A | 2/2011 |
| CN | 201889024 | U | 7/2011 |
| CN | 202220794 | U | 5/2012 |
| CN | 102670381 | A | 9/2012 |
| CN | 103263336 | A | 8/2013 |
| CN | 103390357 | A | 11/2013 |
| CN | 103473631 | A | 12/2013 |
| CN | 103488880 | A | 1/2014 |
| CN | 103501328 | A | 1/2014 |
| CN | 103721343 | A | 4/2014 |
| CN | 203677851 | U | 7/2014 |
| CN | 104335211 | A | 2/2015 |
| CN | 105620643 | A | 6/2016 |
| CN | 105683977 | A | 6/2016 |
| CN | 103136447 | B | 8/2016 |
| CN | 105894088 | A | 8/2016 |
| CN | 105930668 | A | 9/2016 |
| CN | 205626871 | U | 10/2016 |
| CN | 106127646 | A | 11/2016 |
| CN | 106236502 | A | 12/2016 |
| CN | 106510985 | A | 3/2017 |
| CN | 106621195 | A | 5/2017 |
| CN | 107066819 | A | 8/2017 |
| CN | 107430641 | A | 12/2017 |
| CN | 107551475 | A | 1/2018 |
| CN | 107736982 | A | 2/2018 |
| CN | 107930021 | A | 4/2018 |
| CN | 108078737 | A | 5/2018 |
| CN | 208224811 | A | 12/2018 |
| CN | 109191954 | A | 1/2019 |
| CN | 109363887 | A | 2/2019 |
| CN | 208573971 | U | 3/2019 |
| CN | 110148472 | A | 8/2019 |
| CN | 110201358 | A | 9/2019 |
| CN | 110215188 | A | 9/2019 |
| CN | 110322957 | A | 10/2019 |
| CN | 110808092 | A | 2/2020 |
| CN | 110931103 | A | 3/2020 |
| CN | 110993057 | A | 4/2020 |
| CN | 111105859 | A | 5/2020 |
| CN | 111111110 | A | 5/2020 |
| CN | 111370088 | A | 7/2020 |
| CN | 111460305 | A | 7/2020 |
| CN | 112071393 | A | 12/2020 |
| CN | 212141371 | U | 12/2020 |
| CN | 112289425 | A | 1/2021 |
| CN | 212624809 | U | 2/2021 |
| CN | 112603295 | A | 4/2021 |
| CN | 213190965 | U | 5/2021 |
| CN | 113384850 | A | 9/2021 |
| CN | 113499572 | A | 10/2021 |
| CN | 215136488 | U | 12/2021 |
| CN | 113885361 | A | 1/2022 |
| CN | 114049961 | A | 2/2022 |
| CN | 114203274 | A | 3/2022 |
| CN | 216258145 | U | 4/2022 |
| CN | 114694824 | A | 7/2022 |
| CN | 114898832 | A | 8/2022 |
| CN | 114983760 | A | 9/2022 |
| CN | 217472652 | U | 9/2022 |
| CN | 110270062 | B | 10/2022 |
| CN | 218420859 | U | 2/2023 |
| CN | 115954081 | A | 4/2023 |
| DE | 95019 | C | 1/1897 |
| DE | 7628633 | U1 | 12/1977 |
| DE | 8519150 | U1 | 10/1985 |
| DE | 3732905 | A1 | 7/1988 |
| DE | 19619820 | A1 | 12/1996 |
| DE | 29620008 | U1 | 2/1997 |
| DE | 19947926 | A1 | 4/2001 |
| DE | 102018202497 | A1 | 8/2018 |
| DE | 102018211212 | A1 | 1/2019 |
| DE | 102019108425 | B3 | 8/2020 |

(56) References Cited

FOREIGN PATENT DOCUMENTS

| | | | | | |
|---|---|---|---|---|---|
| EP | 199600 | A2 | | 10/1986 | |
| EP | 0383137 | A2 | | 8/1990 | |
| EP | 634319 | A2 | | 1/1995 | |
| EP | 1034817 | A1 | | 9/2000 | |
| EP | 1159989 | A1 | | 12/2001 | |
| EP | 1968028 | | | 9/2008 | |
| EP | 2564904 | A1 | | 3/2013 | |
| EP | 1909730 | B1 | | 4/2014 | |
| EP | 2815242 | A4 | | 12/2014 | |
| EP | 2869805 | A | | 5/2015 | |
| EP | 2997951 | A1 | | 3/2016 | |
| EP | 2688472 | B1 | | 4/2016 | |
| EP | 3264303 | A1 | | 1/2018 | |
| EP | 3323473 | A1 | | 5/2018 | |
| EP | 3627514 | A1 | | 3/2020 | |
| EP | 3671700 | A1 | | 6/2020 | |
| EP | 3688537 | A1 | | 8/2020 | |
| EP | 3731733 | A1 | | 11/2020 | |
| EP | 3984508 | A1 | | 4/2022 | |
| EP | 3984509 | A1 | | 4/2022 | |
| EP | 3984510 | A1 | | 4/2022 | |
| EP | 3984511 | A1 | | 4/2022 | |
| EP | 3984512 | A1 | | 4/2022 | |
| EP | 3984513 | A1 | | 4/2022 | |
| EP | 4054699 | A1 | | 9/2022 | |
| EP | 4112033 | A1 | | 1/2023 | |
| FR | 2527541 | A2 | | 12/1983 | |
| FR | 3127393 | A1 | | 3/2023 | |
| GB | 141664 | A | | 11/1920 | |
| GB | 2336140 | A | | 10/1999 | |
| GB | 2372459 | A | | 8/2002 | |
| GB | 2512431 | A | | 10/2014 | |
| GB | 2591542 | B | | 3/2022 | |
| IN | 201811043670 | A | | 7/2018 | |
| JP | 2000005339 | A | | 1/2000 | |
| JP | 2003225875 | A | | 8/2003 | |
| JP | 2005227928 | A | | 8/2005 | |
| JP | 2005227928 | A1 | | 8/2005 | |
| JP | 2009112336 | A | | 5/2009 | |
| JP | 2013515995 | A | | 5/2013 | |
| JP | 3193662 | U | | 10/2014 | |
| JP | 3198173 | U | * | 6/2015 | ....... A63B 21/00192 |
| JP | 5804063 | B2 | | 11/2015 | |
| JP | 2018102842 | A | | 7/2018 | |
| JP | 2019028647 | A | | 2/2019 | |
| JP | 2019134909 | A | | 8/2019 | |
| JP | 6573739 | B1 | | 9/2019 | |
| JP | 6659831 | B2 | | 3/2020 | |
| JP | 6710357 | B1 | | 6/2020 | |
| JP | 6775757 | B1 | | 10/2020 | |
| JP | 2021027917 | A | | 2/2021 | |
| JP | 6871379 | B2 | | 5/2021 | |
| JP | 2022521378 | A | | 4/2022 | |
| JP | 3238491 | U | | 7/2022 | |
| JP | 7198364 | B2 | | 12/2022 | |
| JP | 7202474 | B2 | | 1/2023 | |
| JP | 7231750 | B2 | | 3/2023 | |
| JP | 7231751 | B2 | | 3/2023 | |
| JP | 7231752 | B2 | | 3/2023 | |
| KR | 20020009724 | A | | 2/2002 | |
| KR | 200276919 | Y1 | | 5/2002 | |
| KR | 20020065253 | A | | 8/2002 | |
| KR | 100582596 | B1 | | 5/2006 | |
| KR | 101042258 | B1 | | 6/2011 | |
| KR | 101258250 | B1 | | 4/2013 | |
| KR | 101325581 | B1 | | 11/2013 | |
| KR | 20140128630 | A | | 11/2014 | |
| KR | 20150017693 | A | | 2/2015 | |
| KR | 20150078191 | A | | 7/2015 | |
| KR | 101580071 | B1 | | 12/2015 | |
| KR | 101647620 | B1 | | 8/2016 | |
| KR | 20160093990 | A | | 8/2016 | |
| KR | 20170038837 | A | | 4/2017 | |
| KR | 20180004928 | A | | 1/2018 | |
| KR | 20190029175 | A | | 3/2019 | |
| KR | 20190056116 | A | | 5/2019 | |
| KR | 101988167 | B1 | | 6/2019 | |
| KR | 101969392 | B1 | | 8/2019 | |
| KR | 102055279 | B1 | | 12/2019 | |
| KR | 102088333 | B1 | | 3/2020 | |
| KR | 20200025290 | A | | 3/2020 | |
| KR | 20200029180 | A | | 3/2020 | |
| KR | 102116664 | B1 | | 5/2020 | |
| KR | 102116968 | B1 | | 5/2020 | |
| KR | 20200056233 | A | | 5/2020 | |
| KR | 102120828 | B1 | | 6/2020 | |
| KR | 102121586 | B1 | | 6/2020 | |
| KR | 102142713 | B1 | | 8/2020 | |
| KR | 102162522 | B1 | | 10/2020 | |
| KR | 20200119665 | A | | 10/2020 | |
| KR | 102173553 | B1 | | 11/2020 | |
| KR | 102180079 | B1 | | 11/2020 | |
| KR | 102188766 | B1 | | 12/2020 | |
| KR | 102196793 | B1 | | 12/2020 | |
| KR | 20210006212 | A | | 1/2021 | |
| KR | 102224188 | B1 | | 3/2021 | |
| KR | 102224618 | B1 | | 3/2021 | |
| KR | 102246049 | B1 | | 4/2021 | |
| KR | 102246050 | B1 | | 4/2021 | |
| KR | 102246051 | B1 | | 4/2021 | |
| KR | 102246052 | B1 | | 4/2021 | |
| KR | 102264498 | B1 | | 6/2021 | |
| KR | 102352602 | B1 | | 1/2022 | |
| KR | 102352603 | B1 | | 1/2022 | |
| KR | 102352604 | B1 | | 1/2022 | |
| KR | 20220004639 | A | | 1/2022 | |
| KR | 102387577 | B1 | | 4/2022 | |
| KR | 102421437 | B1 | | 7/2022 | |
| KR | 20220102207 | A | | 7/2022 | |
| KR | 102427545 | B1 | | 8/2022 | |
| KR | 102467495 | B1 | | 11/2022 | |
| KR | 102467496 | B1 | | 11/2022 | |
| KR | 102469723 | B1 | | 11/2022 | |
| KR | 102471990 | B1 | | 11/2022 | |
| KR | 20220145989 | A | | 11/2022 | |
| KR | 20220156134 | A | | 11/2022 | |
| KR | 102502744 | B1 | | 2/2023 | |
| KR | 20230019349 | A | | 2/2023 | |
| KR | 20230019350 | A | | 2/2023 | |
| KR | 20230026556 | A | | 2/2023 | |
| KR | 20230026668 | A | | 2/2023 | |
| KR | 20230040526 | | | 3/2023 | |
| KR | 20230050506 | A | | 4/2023 | |
| KR | 20230056118 | A | | 4/2023 | |
| KR | 102528503 | B1 | | 5/2023 | |
| KR | 102532766 | B1 | | 5/2023 | |
| KR | 102539190 | B1 | | 6/2023 | |
| RU | 2014131288 | A | | 2/2016 | |
| RU | 2607953 | C2 | | 1/2017 | |
| TW | M474545 | U | | 3/2014 | |
| TW | I442956 | B | | 7/2014 | |
| TW | M638437 | U | | 3/2023 | |
| WO | 1998009687 | | | 3/1998 | |
| WO | 0149235 | A2 | | 7/2001 | |
| WO | 0151083 | A2 | | 7/2001 | |
| WO | 2001050387 | A1 | | 7/2001 | |
| WO | 2001056465 | A1 | | 8/2001 | |
| WO | 02093312 | A2 | | 11/2002 | |
| WO | 2003043494 | | | 5/2003 | |
| WO | 2005018453 | A1 | | 3/2005 | |
| WO | WO-2006004430 | A2 | * | 1/2006 | ........... A63B 22/001 |
| WO | 2006012694 | A1 | | 2/2006 | |
| WO | 2007102709 | A1 | | 9/2007 | |
| WO | WO-2008114291 | A1 | * | 9/2008 | ........... A63B 22/001 |
| WO | 2011025322 | A2 | | 3/2011 | |
| WO | 2012128801 | A1 | | 9/2012 | |
| WO | 2013002568 | A2 | | 1/2013 | |
| WO | 2023164292 | A1 | | 3/2013 | |
| WO | 2013122839 | A1 | | 8/2013 | |
| WO | 2014011447 | A1 | | 1/2014 | |
| WO | 2014163976 | A1 | | 10/2014 | |
| WO | 2015026744 | A1 | | 2/2015 | |
| WO | 2015065298 | A1 | | 5/2015 | |
| WO | 2015082555 | A1 | | 6/2015 | |

(56) References Cited

FOREIGN PATENT DOCUMENTS

| | | | | |
|---|---|---|---|---|
| WO | WO-2016154318 | A1 * | 9/2016 | ....... A63B 21/00069 |
| WO | 2017030781 | A1 | 2/2017 | |
| WO | 2017091691 | A1 | 6/2017 | |
| WO | 2017165238 | A1 | 9/2017 | |
| WO | 2018081795 | A1 | 5/2018 | |
| WO | 2018171853 | A1 | 9/2018 | |
| WO | 2019022706 | A1 | 1/2019 | |
| WO | 2019143940 | A1 | 7/2019 | |
| WO | 2020185769 | A1 | 3/2020 | |
| WO | 2020075190 | A1 | 4/2020 | |
| WO | 2020130979 | A1 | 6/2020 | |
| WO | 2020149815 | A2 | 7/2020 | |
| WO | 2020245727 | A1 | 12/2020 | |
| WO | 2020249855 | A1 | 12/2020 | |
| WO | 2020252599 | A1 | 12/2020 | |
| WO | 2020256577 | A1 | 12/2020 | |
| WO | 2021021447 | A1 | 2/2021 | |
| WO | 2021038980 | A1 | 3/2021 | |
| WO | 2021055427 | A1 | 3/2021 | |
| WO | 2021055491 | A1 | 3/2021 | |
| WO | 2021061061 | A1 | 4/2021 | |
| WO | 2021081094 | A1 | 4/2021 | |
| WO | 2021090267 | A1 | 5/2021 | |
| WO | 2021138620 | A1 | 7/2021 | |
| WO | 2021216881 | A1 | 10/2021 | |
| WO | 2021236542 | A1 | 11/2021 | |
| WO | 2021236961 | A1 | 11/2021 | |
| WO | 2021262809 | A1 | 12/2021 | |
| WO | 2022047006 | A1 | 3/2022 | |
| WO | 2022092493 | A1 | 5/2022 | |
| WO | 2022092494 | A1 | 5/2022 | |
| WO | 2022212883 | A1 | 10/2022 | |
| WO | 2022212921 | A1 | 10/2022 | |
| WO | 2022216498 | A1 | 10/2022 | |
| WO | 2022251420 | A1 | 12/2022 | |
| WO | 2023008680 | A1 | 2/2023 | |
| WO | 2023008681 | A1 | 2/2023 | |
| WO | 2023022319 | A1 | 2/2023 | |
| WO | 2023022320 | A1 | 2/2023 | |
| WO | 2023052695 | A1 | 4/2023 | |
| WO | 2023091496 | A1 | 5/2023 | |
| WO | 2023215155 | A1 | 11/2023 | |
| WO | 2023230075 | A1 | 11/2023 | |

OTHER PUBLICATIONS

Claris Healthcare Inc., Claris Reflex Patient Rehabilitation System Brochure, retrieved on Oct. 2, 2019, 5 pages, https://clarisreflex.com/.
Fysiomed, "16983—Vario adjustable pedal arms," retrieved on Aug. 4, 2020, 1 page, https://www.fysiomed.com/en/products/16983-vario-adjustable-pedal-arms.
HCL Fitness, HCI Fitness physio trainer, announced 2017 [online], 2017, retrieved on Nov. 10, 2020, https://www.amazon.com/HCI-Fitness-Physio Trainer-Electronically-Controlled/dp/B0759YMW78/.
International Searching Authority, Search Report and Written Opinion for International Application No. PCT/US2017/50895, Date of Mailing Jan. 12, 2018, 6 pages.
International Searching Authority, Search Report and Written Opinion for International Application No. PCT/US2020/51008, Date of Mailing Dec. 10, 2020, 9 pages.
International Searching Authority, Search Report and Written Opinion for International Application No. PCT/US2020/56661, Date of Mailing Feb. 12, 2021, 12 pages.
International Searching Authority, Search Report and Written Opinion for International Application No. PCT/US2020/021876, Date of Mailing May 28, 2020, 8 pages.
International Searching Authority, Search Report and Written Opinion for International Application No. PCT/US2021/032807, Date of Mailing Sep. 6, 2021, 11 pages.
Matrix, "R3xm Recumbent Cycle," retrieved on Aug. 4, 2020, 1 page, https://www.matrixfitness.com/en/cardio/cycles/r3xm-recumbent.
ROM3 Rehab, "ROM3 Rehab System," Apr. 20, 2015, retrieved on Aug. 31, 2018, https://vimeo.com/125438463.
International Preliminary Report on Patentability of International Application No. PCT/US2017/50895, Date of Mailing Dec. 11, 2018, 52 pages.
Jennifer Bresnick, "What is the Role of Natural Language Processing in Healthcare?", pp. 1-7, published Aug. 18, 2016, retrieved on Feb. 1, 2022 from https://healthitanalytics.com/ featu res/what-is-the-role-of-natural-language-processing-in-healthcare.
Alex Bellec, "Part-of-Speech tagging tutorial with the Keras Deep Learning library," pp. 1-16, published Mar. 27, 2018, retrieved on Feb. 1, 2022 from https://becominghuman.ai/part-of-speech-tagging-tutorial-with-the-keras-deep-learning-library-d7f93fa05537.
Kavita Ganesan, All you need to know about text preprocessing for NLP and Machine Learning, pp. 1-14, published Feb. 23, 2019, retrieved on Feb. 1, 2022 from https:// towardsdatascience.com/all-you-need-to-know-about-text-preprocessing-for-nlp-and-machine-learning-bcl c5765ff67.
Badreesh Shetty, "Natural Language Processing (NPL) for Machine Learning," pp. 1-13, published Nov. 24, 2018, retrieved on Feb. 1, 2022 from https://towardsdatascience. com/natural-language-processing-nlp-for-machine-learning-d44498845d5b.
Davenport et al., "The Potential For Artificial Intelligence In Healthcare", 2019, Future Healthcare Journal 2019, vol. 6, No. 2: Year: 2019, pp. 1-5.
Ahmed et al., "Artificial Intelligence With Multi-Functional Machine Learning Platform Development For Better Healthcare And Precision Medicine", 2020, Database (Oxford), 2020:baaa010. doi: 10.1093/database/baaa010 (Year: 2020), pp. 1-35.
Ruiz Ivan et al., "Towards a physical rehabilitation system using a telemedicine approach", Computer Methods in Biomechanics and Biomedical Engineering: Imaging & Visualization, vol. 8, No. 6, Jul. 28, 2020, pp. 671-680, XP055914810.
De Canniere Helene et al., "Wearable Monitoring and Interpretable Machine Learning Can Objectively Track Progression in Patients during Cardiac Rehabilitation", Sensors, vol. 20, No. 12, Jun. 26, 2020, XP055914617, pp. 1-15.
Boulanger Pierre et al., "A Low-cost Virtual Reality Bike for Remote Cardiac Rehabilitation", Dec. 7, 2017, Advances in Biometrics: International Conference, ICB 2007, Seoul, Korea, pp. 155-166.
Yin Chieh et al., "A Virtual Reality-Cycling Training System for Lower Limb Balance Improvement", BioMed Research International, vol. 2016, pp. 1-10.
Barrett et al., "Artificial intelligence supported patient self-care in chronic heart failure: a paradigm shift from reactive to predictive, preventive and personalised care," EPMA Journal (2019), pp. 445-464.
Oerkild et al., "Home-based cardiac rehabilitation is an attractive alternative to no cardiac rehabilitation for elderly patients with coronary heart disease: results from a randomised clinical trial," BMJ Open Accessible Medical Research, Nov. 22, 2012, pp. 1-9.
Bravo-Escobar et al., "Effectiveness and safety of a home-based cardiac rehabilitation programme of mixed surveillance in patients with ischemic heart disease at moderate cardiovascular risk: A randomised, controlled clinical trial," BMC Cardiovascular Disorders, 2017, pp. 1-11, vol. 17:66.
Thomas et al., "Home-Based Cardiac Rehabilitation," Circulation, 2019, pp. e69-e89, vol. 140.
Thomas et al., "Home-Based Cardiac Rehabilitation," Journal of the American College of Cardiology, Nov. 1, 2019, pp. 133-153, vol. 74.
Thomas et al., "Home-Based Cardiac Rehabilitation," HHS Public Access, Oct. 2, 2020, pp. 1-39.
Dittus et al., "Exercise-Based Oncology Rehabilitation: Leveraging the Cardiac Rehabilitation Model," Journal of Cardiopulmonary Rehabilitation and Prevention, 2015, pp. 130-139, vol. 35.
Chen et al., "Home-based cardiac rehabilitation improves quality of life, aerobic capacity, and readmission rates in patients with chronic heart failure," Medicine, 2018, pp. 1-5 vol. 97:4.

(56) References Cited

OTHER PUBLICATIONS

Lima de Melo Ghisi et al., "A systematic review of patient education in cardiac patients: Do they increase knowledge and promote health behavior change?," Patient Education and Counseling, 2014, pp. 1-15.
Fang et al., "Use of Outpatient Cardiac Rehabilitation Among Heart Attack Survivors—20 States and the District of Columbia, 2013 and Four States, 2015," Morbidity and Mortality Weekly Report, vol. 66, No. 33, Aug. 25, 2017, pp. 869-873.
Beene et al., "AI and Care Delivery: Emerging Opportunities For Artificial Intelligence To Transform How Care Is Delivered," Nov. 2019, American Hospital Association, pp. 1-12.
Malloy, Online Article "AI-enabled EKGs find difference between numerical age and biological age significantly affects health, longevity", Website: https://newsnetwork.mayoclinic.org/discussion/ai-enabled-ekgs-find-difference-between-numerical-age-and-biological-age-significantly-affects-health-longevity/, Mayo Clinic News Network, May 20, 2021, retrieved: Jan. 23, 2023, p. 1-4.
Jeong et al., "Computer-assisted upper extremity training using interactive biking exercise (iBikE) platform," Sep. 2012, pp. 1-5, 34th Annual International Conference of the IEEE EMBS.
Website for "Pedal Exerciser", p. 1, retrieved on Sep. 9, 2022 from https://www.vivehealth.com/collections/physical-therapy-equipment/products/pedalexerciser.
Website for "Functional Knee Brace with ROM", p. 1, retrieved on Sep. 9, 2022 from http://medicalbrace.gr/en/product/functional-knee-brace-with-goniometer-mbtelescopicknee/.
Website for "ComfySplints Goniometer Knee", pp. 1-5, retrieved on Sep. 9, 2022 from https://www.comfysplints.com/product/knee-splints/.
Website for "BMI FlexEze Knee Corrective Orthosis (KCO)", pp. 1-4, retrieved on Sep. 9, 2022 from https://orthobmi.com/products/bmi-flexeze%C2%AE-knee-corrective-orthosis-kco.
Website for "Neoprene Knee Brace with goniometer—Patella ROM MB.4070", pp. 1-4, retrieved on Sep. 9, 2022 from https://www.fortuna.com.gr/en/product/neoprene-knee-brace-with-goniometer-patella-rom-mb-4070/.
Kuiken et al., "Computerized Biofeedback Knee Goniometer: Acceptance and Effect on Exercise Behavior in Post-total Knee Arthroplasty Rehabilitation," Biomedical Engineering Faculty Research and Publications, 2004, pp. 1-10.
Ahmed et al., "Artificial intelligence with multi-functional machine learning platform development for better healthcare and precision medicine," Database, 2020, pp. 1-35.
Davenport et al., "The potential for artificial intelligence in healthcare," Digital Technology, Future Healthcare Journal, 2019, pp. 1-5, vol. 6, No. 2.
Website for "OxeFit XS1", pp. 1-3, retrieved on Sep. 9, 2022 from https://www.oxefit.com/xs1.
Website for "Preva Mobile", pp. 1-6, retrieved on Sep. 9, 2022 from https://www.precor.com/en-us/resources/introducing-preva-mobile.
Website for "J-Bike", pp. 1-3, retrieved on Sep. 9, 2022 from https://www.magneticdays.com/en/cycling-for-physical-rehabilitation.
Website for "Excy", pp. 1-12, retrieved on Sep. 9, 2022 from https://excy.com/portable-exercise-rehabilitation-excy-xcs-pro/.
Website for "OxeFit XP1", p. 1, retrieved on Sep. 9, 2022 from https://www.oxefit.com/xp1.
International Search Report and Written Opinion for PCT/US2023/014137, dated Jun. 9, 2023, 13 pages.
Website for "Esino 2022 Physical Therapy Equipments Arm Fitness Indoor Trainer Leg Spin Cycle Machine Exercise Bike for Elderly," https://www.made-in-china.com/showroom/esinogroup/product-detailYdZtwGhCMKVR/China-Esino-2022-Physical-Therapy-Equipments-Arm-Fitness-Indoor-Trainer-Leg-Spin-Cycle-Machine-Exercise-Bike-for-Elderly.html, retrieved on Aug. 29, 2023, 5 pages.
Abedtash, "An Interoperable Electronic Medical Record-Based Platform For Personalized Predictive Analytics", ProQuest LLC, Jul. 2017, 185 pages.
Chrif et al., "Control design for a lower-limb paediatric therapy device using linear motor technology," Article, 2017, pp. 119-127, Science Direct, Switzerland.
Robben et al., "Delta Features From Ambient Sensor Data are Good Predictors of Change in Functional Health," Article, 2016, pp. 2168-2194, vol. 21, No. 4, IEEE Journal of Biomedical and Health Informatics.
Kantoch et al., "Recognition of Sedentary Behavior by Machine Learning Analysis of Wearable Sensors during Activities of Daily Living for Telemedical Assessment of Cardiovascular Risk," Article, 2018, 17 pages, Sensors, Poland.
Warburton et al., "International Launch of the PAR-•Q+ and ePARmed-•X+ Validation of the PAR-•Q+ and ePARmed••X+," Health & Fitness Journal of Canada, 2011, 9 pages, vol. 4, No. 2.
Gerbild et al., "Physical Activity to Improve Erectile Dysfunction: A Systematic Review of Intervention Studies," Sexual Medicine, 2018, 15 pages.
Alcaraz et al., "Machine Learning as Digital Therapy Assessment for Mobile Gait Rehabilitation," 2018 IEEE 28th International Workshop on Machine Learning for Signal Processing (MLSP), Aalborg, Denmark, 2018, 6 pages.
Androutsou et al., "A Smartphone Application Designed to Engage the Elderly in Home-Based Rehabilitation," Frontiers in Digital Health, Sep. 2020, vol. 2, Article 15, 13 pages.
Silva et al., "SapoFitness: A mobile health application for dietary evaluation," 2011 IEEE 13th International Conference on U e-Health Networking, Applications and Services, Columbia, MO, USA, 2011, 6 pages.
Wang et al., "Interactive wearable systems for upper body rehabilitation: a systematic review," Journal of NeuroEngineering and Rehabilitation, 2017, 21 pages.
Marzolini et al., "Eligibility, Enrollment, and Completion of Exercise-Based Cardiac Rehabilitation Following Stroke Rehabilitation: What Are the Barriers?," Physical Therapy, vol. 100, No. 1, 2019, 13 pages.
Nijjar et al., "Randomized Trial of Mindfulness-Based Stress Reduction in Cardiac Patients Eligible for Cardiac Rehabilitation," Scientific Reports, 2019, 12 pages.
Lara et al., "Human-Robot Sensor Interface for Cardiac Rehabilitation," IEEE International Conference on Rehabilitation Robotics, Jul. 2017, 8 pages.
Ishraque et al., "Artificial Intelligence-Based Rehabilitation Therapy Exercise Recommendation System," 2018 IEEE MIT Undergraduate Research Technology Conference (URTC), Cambridge, MA, USA, 2018, 5 pages.
Zakari et al., "Are There Limitations to Exercise Benefits in Peripheral Arterial Disease?," Frontiers in Cardiovascular Medicine, Nov. 2018, vol. 5, Article 173, 12 pages.
You et al., "Including Blood Vasculature into a Game-Theoretic Model of Cancer Dynamics," Games 2019, 10, 13, 22 pages.
Jeong et al., "Computer-assisted upper extremity training using interactive biking exercise (iBikE) platform," Sep. 2012, 34th Annual International Conference of the IEEE EMBS, 5 pages.

* cited by examiner

SYSTEM, METHOD AND APPARATUS FOR ELECTRICALLY ACTUATED PEDAL FOR AN EXERCISE OR REHABILITATION MACHINE

CROSS-REFERENCE TO RELATED APPLICATIONS

This application is a continuation of U.S. patent application Ser. No. 16/813,224, filed Mar. 9, 2020, which claims priority to and the benefit of U.S. Prov. Pat. App. No. 62/816,550, filed Mar. 11, 2019, and U.S. Prov. Pat. App. No. 62/816,557, filed on Mar. 11, 2019. The contents of the above-referenced applications are incorporated herein by reference in their entirety.

FIELD

The present disclosure relates generally to a pedal and pedal systems for an exercise or rehabilitation machine and, in particular, a pedal that is remotely adjustable during operation.

BACKGROUND

Improvement is desired in the design of adjustable rehabilitation and exercise devices. Adjustable rehabilitation and exercise devices are desired to customize rehabilitation and exercise to an individual. Some devices include pedals on opposite sides to engage a user. See, e.g., U.S. Pat. No. 10,173,094, titled Adjustable Rehabilitation and Exercise Device, issued to Gomberg, et al., which is hereby incorporated by reference in its entirety.

Accordingly, in one aspect, the disclosure provides an adjustable rehabilitation and exercise device having patient engagement members on opposite sides of the device, which are adjustably positionable relative to one another both radially and angularly.

SUMMARY

This section provides a general summary of the present disclosure and is not a comprehensive disclosure of its full scope or all of its features, aspects and objectives.

In accordance with one aspect of the disclosure, a pedal or pedal mechanism is electrically actuatable in response to control signals. The pedal mechanism can be part of equipment for electromechanical exercise or rehabilitation of a user. The pedal mechanism can include a pedal configured to engage an appendage or extremity (e.g., arm or leg) of the user of the equipment and a spindle supporting the pedal and having a spindle axis. A pedal arm assembly supports the spindle and is coupled to a rotational axle of the equipment that is radially offset from the spindle axis to define a range of radial travel of the pedal relative to the rotational axle. The pedal arm assembly can include an electrically actuated coupling assembly to adjust a radial position of the pedal relative to the rotational axle in response to a control signal and to monitor or regulate motion of the user engaged with the pedal.

In accordance with an aspect of the disclosure, the pedal arm assembly includes a housing with an elongate aperture through which the spindle extends.

In accordance with an aspect of the disclosure, the coupling assembly includes a carriage mounted in the housing and supporting the spindle.

In accordance with an aspect of the disclosure, an electric motor is connected to the carriage to linearly move the spindle extending though the elongate aperture. In accordance with an aspect of the disclosure, the elongate aperture is orthogonal to the spindle axis.

In accordance with an aspect of the disclosure, the coupling assembly includes a drivescrew that is rotated by the electric motor and is threadingly connected to the carriage.

In accordance with an aspect of the disclosure, the carriage includes a throughbore receiving the leadscrew and a threaded nut mounted adjacent to the throughbore for threaded engagement with the leadscrew.

In accordance with an aspect of the disclosure, the coupling assembly includes a rail adjacent and parallel to the leadscrew in the housing. The carriage can engage the rail to define linear travel of the carriage and the range of radial travel of the pedal.

In accordance with an aspect of the disclosure, the coupling assembly includes a slide pad intermediate the carriage and an interior wall of the housing adjacent the drivescrew.

In accordance with an aspect of the disclosure, the coupling assembly is configured to adjust the radial position of the pedal in response to the control signal during pedaling of the pedal.

In accordance with an aspect of the disclosure, the coupling assembly is configured to adjust the radial position of the pedal to produce an elliptical pedal path, relative to the rotational axle, during a revolution of the pedal.

In accordance with an aspect of the disclosure, the pedal includes a pressure sensor to sense force applied to the pedal and transmit sensed force to a remote or distal receiver.

In accordance with an aspect of the disclosure, the pedal includes a pedal bottom to receive the spindle and pivot thereon, pressure sensors, a base plate supported on the pedal bottom and supporting the pressure sensors, and a pedal top above the base plate and operatively engaged with the pressure sensors to transmit force from the user of the pedal to the pressure sensors.

In accordance with an aspect of the disclosure, the plurality of pressure sensors includes a toe sensor to sense a first pressure and a heel sensor to sense a second pressure. The first pressure and the second pressure are used by the control system to determine a net force or a true force on the pedal, as will be described herein.

In accordance with an aspect of the disclosure, the coupling assembly is configured to translate rotational motion of the electric motor to radial motion of the pedals.

In accordance with an aspect of the disclosure, a method can electrically adjust a radial position of a pedal relative to a rotational axle in response to a control signal, regulating rotational motion of the user engaged with the pedal, and sensing rotational position of the pedal.

In accordance with an aspect of the disclosure, electrically adjusting the radial position of the pedal includes controlling an electric motor connected to a carriage to linearly move the spindle extending though an elongate aperture of a housing.

In accordance with an aspect of the disclosure, electrically adjusting the radial position of the pedal includes mechanically supporting the carriage in the housing on the rail to define linear travel of the carriage and a range of radial travel of the pedal.

In accordance with an aspect of the disclosure, electrically adjusting the radial position of the pedal includes rotating a leadscrew driven by the electric motor and connected to the carriage.

In accordance with an aspect of the disclosure, electrically adjusting the radial position of the pedal includes adjusting the radial position of the pedal, during a revolution of the pedal, to produce an elliptical pedal path relative to the rotational axle.

In accordance with an aspect of the disclosure, electrically adjusting the radial position of the pedal includes adjusting the radial position of the pedal in response to the control signal during pedaling of the pedal.

In accordance with an aspect of the disclosure, regulating rotational motion includes measuring force applied to the pedal and transmitting the measured force to a remote receiver.

The above aspects of the disclosure describe a pedal that is actuatable in response to control signals to adjust its position for travel

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
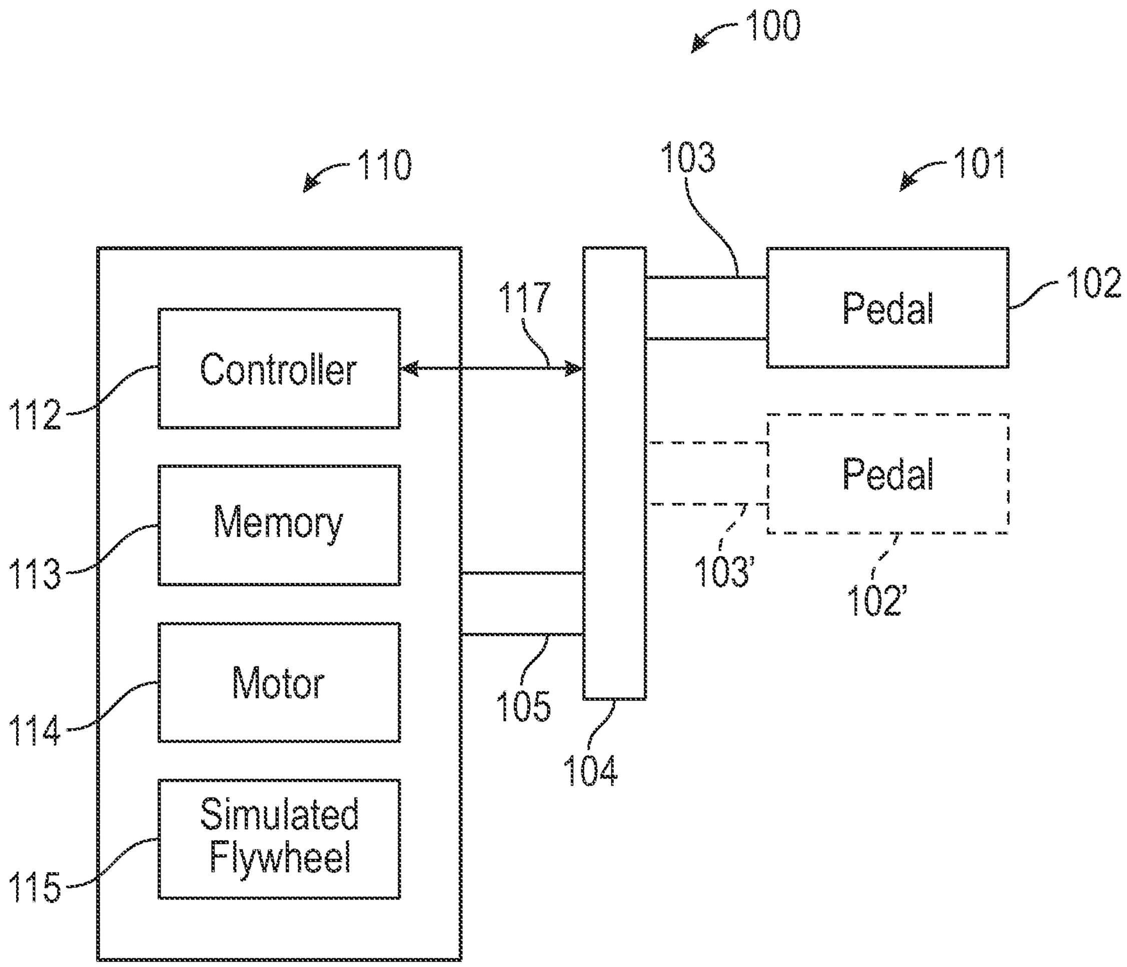
FIG. 1 is a schematic view of an exercise machine with an actuatable pedal in accordance with the present disclosure.

In general, embodiments of a pedal or pedal system to be engaged by a user to provide exercise or rehabilitation are disclosed. The pedal can be adjusted in its position using control signals. The control signals can be produced according to an application, which in some example embodiments receives position or force signals from the pedal itself. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the present disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

In an aspect, the disclosure provides an adjustable rehabilitation and exercise device having patient engagement members (pedals, handgrips, or the like) on opposite sides of the device, which are adjustably positionable relative to one another radially to provide controlled movement of the members during travel of the engagement members to provide rehabilitation, exercise or both.

In an example embodiment, the pedal mechanism or assembly can be part of a rotary rehabilitation apparatus to provide exercise or movement to a user, e.g., moving joints and activating muscles, tendons, and ligaments. The pedal mechanism can assist in tailoring to the user's needs based upon the user's physical size, type of injury, and treatment schedule. The pedal mechanism can provide for adjustment of the range of motion of the user's extremity in a cycling motion by driving an electrical motor in response to control signals. The control signals can be based on a treatment schedule stored in a controller. The control signals can be based at least in part on sensed characteristics of the pedaling action, e.g., in real time use. The pedals can be moved during a revolution to adjust the travel path to alter the travel path of one or more of the user's limbs from a circular path. The control of the pedal positioning can assist in the rehabilitation of the user by precisely controlling the user's extension and flexion at the user's joints.

FIGS. 1-9, discussed below, and the various embodiments used to describe the principles of this disclosure are by way of illustration only and should not be construed in any way to limit the scope of the disclosure.

FIG. 1 shows a schematic view of a rehabilitation system 100 that includes a pedal system 101 operably engaged with a base 110, in accordance with the present disclosure. The pedal system 101 includes an engagement member, e.g., a pedal 102, to engage a user with the rehabilitation system. The pedal 102 is configured for interacting with a patient to be rehabilitated and may be configured for use with lower body extremities such as the feet or legs, or upper body extremities such as the hands or arms, or any other suitable body parts. The pedal 102 is positioned on a spindle 103 that is supported on a pedal arm assembly 104. The pedal 102 can be pivotably mounted on the spindle 103. The pedal arm assembly 104 is connected to the axle 105 of the base 110, which supports and, at times, drives the axle 105. A controller 112 is electrically connected to the pedal arm assembly 104 to provide a control signal to control operation of the pedal arm assembly 104. The pedal arm assembly 104 can be coupled to the axle 105 of the rehabilitation or exercise machine with the axle being radially offset from the axis of the spindle 103 to define a range of radial travel of the pedal 102 relative to the axle 105. As shown in FIG. 1, the pedal 102 can be moved from a first position (solid line) to a second position as illustrated by pedal 102' (broken line). The spindle 103 is moved by the pedal arm assembly relative to the fixed axle 105 from the first position (solid line, 103) and a second position (broken line, 103'). The pedal arm assembly 104 is electrically actuatable by a control signal 117 from the controller 112. The pedal arm assembly 104 adjusts a radial position of the pedal 102, e.g., from the solid line position to the broken line position or vice versa, or to any position in between, relative to the axle. In an embodiment with two pedals, one for the left foot and one for the right, each pedal can be individually controlled by the controller 112. The pedal 102 (solid line) is positioned radially outwardly from the pedal 102' (broken line). The pedal 102 will have a larger travel path than the pedal 102' as they rotate around the axle 105. The base 110 includes an electric motor 114 for providing a driving force or resistance to the pedal 102 and for providing a simulated flywheel 115.

FIGS. 2A, 2B, 2C and 2D show the pedal 102 in a perspective view, a side view, a rear end view, and a top view, respectively. The pedal 102 includes a pedal bottom cover 201 and a pedal frame 203 on the pedal bottom cover 201. The pedal frame 203 can be rigid and define a throughbore 205 to receive the spindle 103. The spindle 103 can be fixed longitudinally in the throughbore 205 while allowing the pedal frame 203 to pivot on the spindle 103. The spindle 103 extends out of one end of the throughbore 205 and the other end of the throughbore 205 can be covered by a cap 206. A pedal top 207 is joined on the top of the pedal frame 203 and is configured to receive a foot of a user. The pedal top 207 may include treads to grip a user's shoe tread or foot directly. The pedal top 207 can include a lip 209 around the periphery with a heel portion being taller than the other parts of the lip. The lip 209 assists in preventing the user's foot from sliding off the pedal top 207. The pedal top 207 is moveably mounted to pedal frame 203 to transfer a force applied onto the pedal top 207 to one or more force sensors that are in the pedal 102.

Figure 2A:
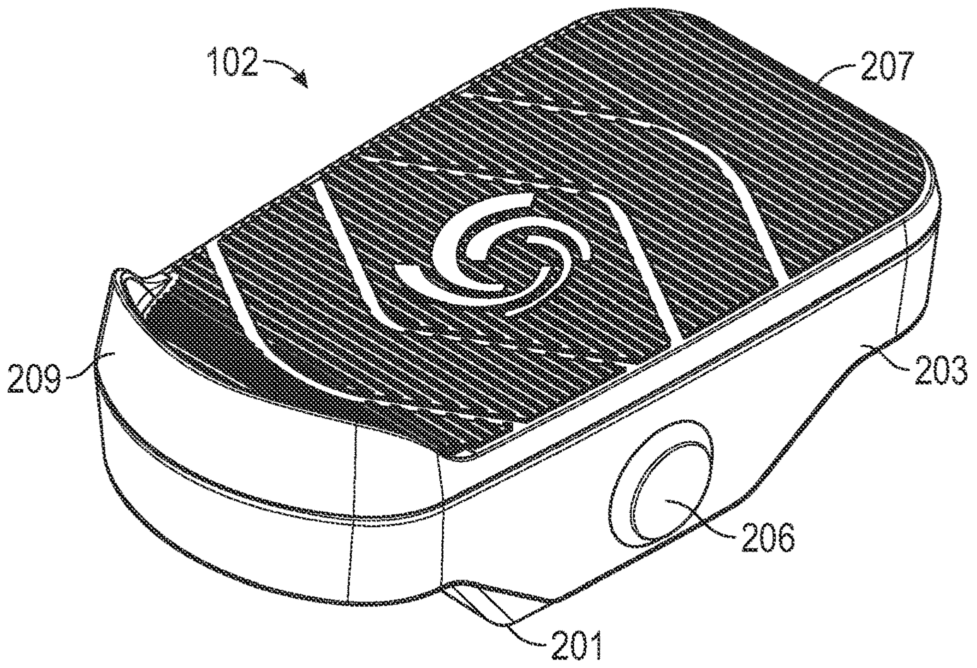
FIGS. 2A-2E are views of the pedal in accordance with the present disclosure.
Figure 2B:
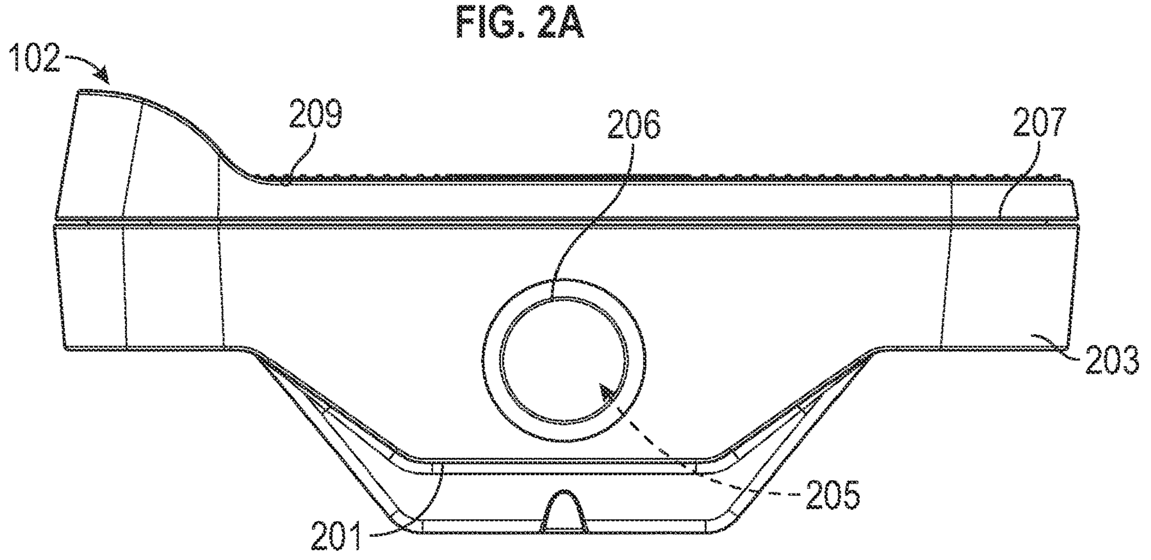
Figure 2C:
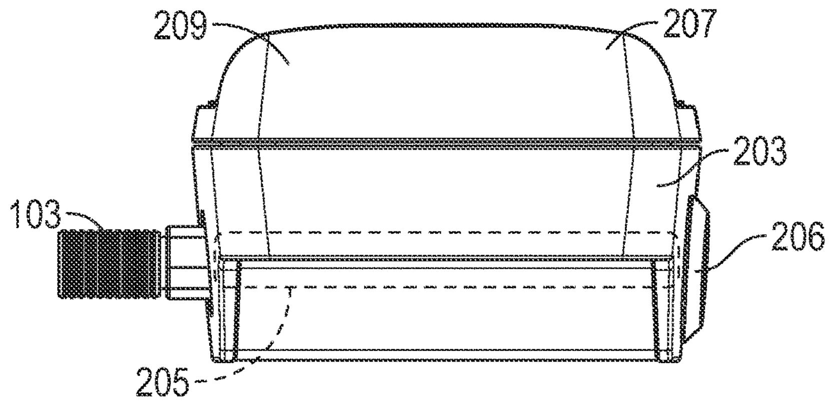
Figure 2D:
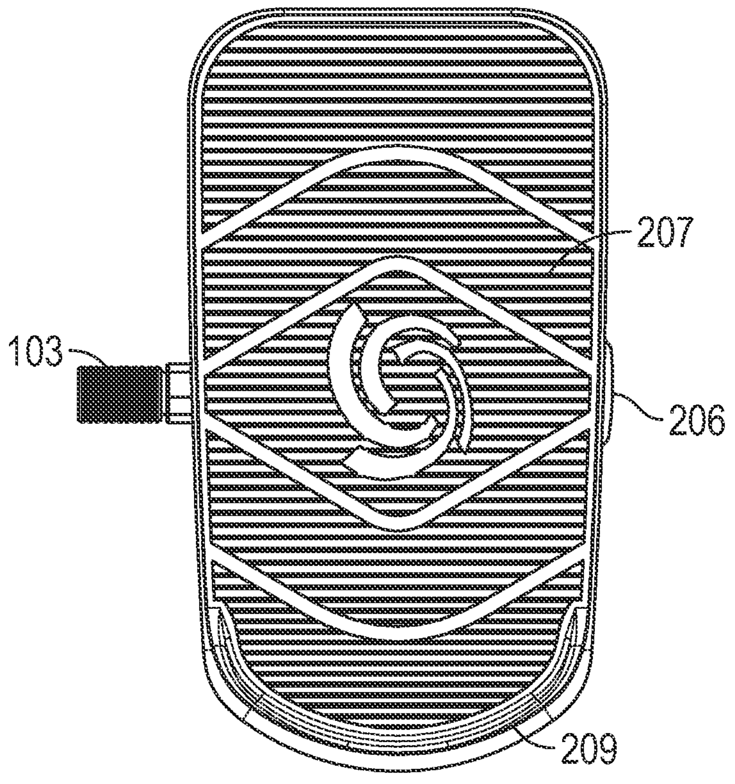
Figure 2E:
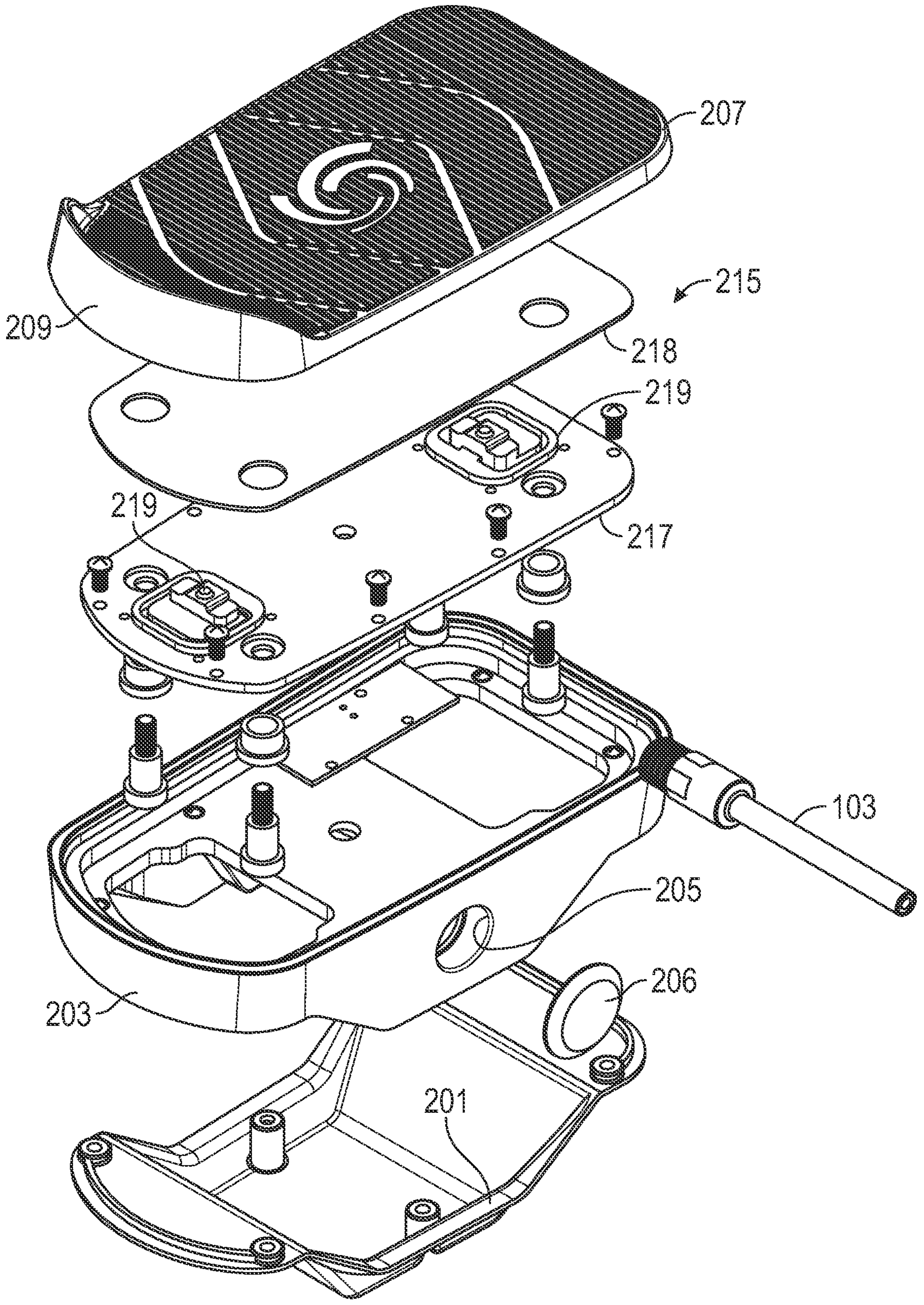

FIG. 2E is an exploded view of the pedal 102 to illustrate the structure to sense force applied to the pedal during exercise or rehabilitation. A sensor assembly 215 is mounted within the pedal 102. The sensor assembly 215 includes base plate 217, a top plate 218 above the base plate 217, and one or more force sensors 219 (e.g., a heel sensor located at a heel end of the pedal or a toe sensor located at a toe end of the pedal) between the plates 217, 218. The one or more force sensors 219 sense the force applied to the pedal and output a sensor value that represents force applied to the pedal. The sensor value may go to the controller 112 (FIG. 1). The sensors can output a wireless signal representing the sensed-force or can output a wired signal (e.g., through the spindle 103). The base plate 217 is fixed within an upper recess in the pedal frame 203. One or more force sensors 219 are fixed to the top surface of the base plate 217 or a bottom surface of the top plate 218. In an example, one force sensor is positioned on base plate 217. In the illustrated example, the heel sensor is positioned at the heel end of the base plate 217 and the toe sensor is positioned at the toe end of the base plate 217. When a plurality of sensors is used, the sensor assembly 215 can include processor circuitry and memory operably coupled thereto to perform calculations on sensed-force signals from all of the force sensors 219 and output a calculated force signal from the pedal 102. The force sensors 219 can be strain gauges, (e.g., foil strain gauge, which changes electrical resistance when it is deformed, and the electrical resistance can be determined by a Wheatstone bridge). The strain gauge can be a piezoresistor, microelectromechanical system (MEMS), variable capacitors, or other sensors that output a signal when a force is applied thereto. The base plate 217 and the top plate 218 move relative to each other such that the force moving at least one of the plates 217, 218 is applied to one of the force sensors 219. In an example embodiment, the plates 217, 218 travel less than 2 mm, 1 mm, or 0.5 mm relative to each other and any movement applies a force to the force sensors 219. In operation, the user will apply a force to the pedal top 207. This force will cause the pedal 102 to rotate in a travel path defined by the position of the spindle 103 relative to the axle 105. There can be some resistance, inertial or applied, as described herein. The resistance to pedal rotation must be overcome by the application of force by the user. This force is transmitted through the pedal top 207 to the force sensors 219, which output a measurement value representing this force.

Figure 3A:
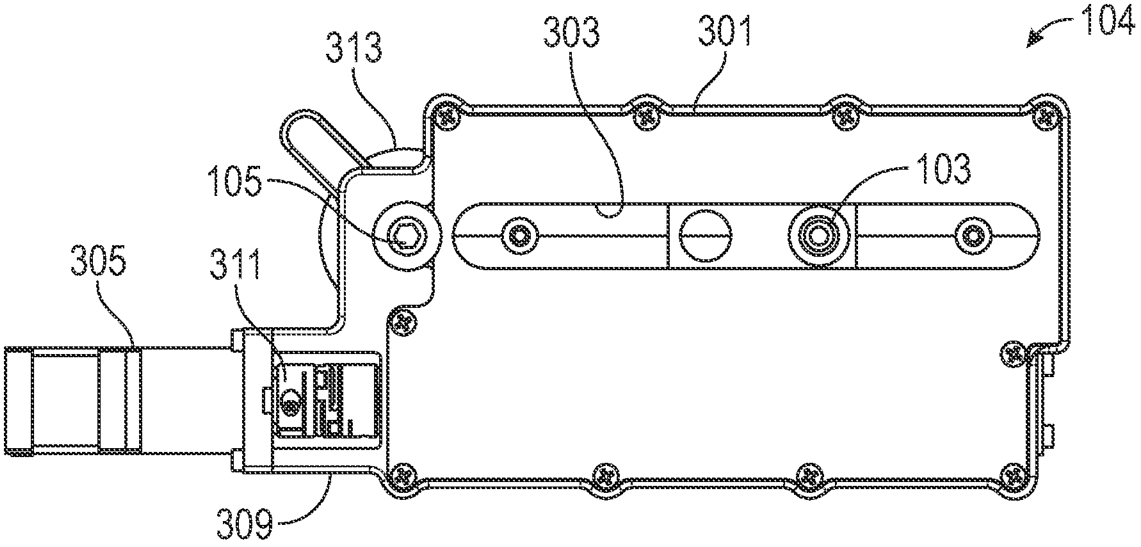
FIGS. 3A-3C are views of the pedal arm assembly in accordance with the present disclosure.
Figure 3B:
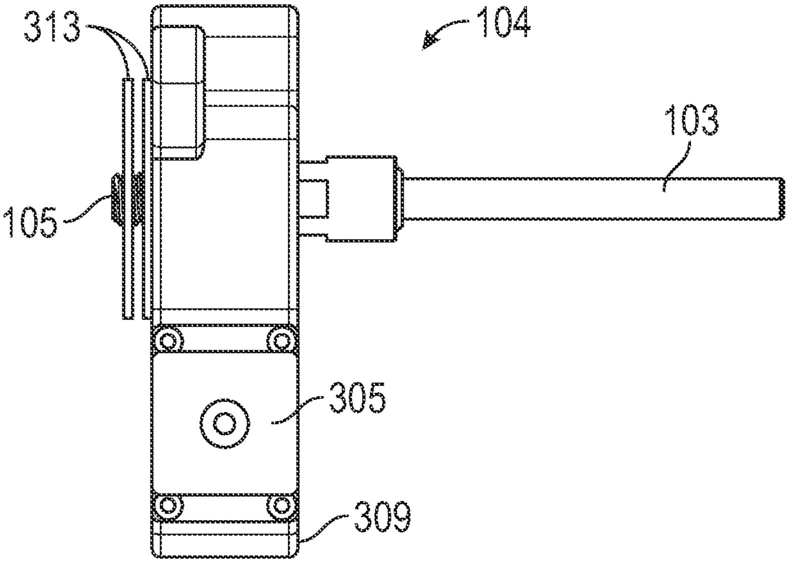

FIGS. 3A and 3B are a side view and an end view of the pedal arm assembly 104, respectively. The pedal arm assembly 104 includes a housing 301 with an aperture 303 through which the spindle 103 extends. The aperture 303 defines the linear travel of the spindle 103 (and, hence, the pedal 102) relative to the fixed axle 105. A carriage 304 is in the housing 301 aligned with the aperture 303. The carriage 304 supports the spindle 103 for travel orthogonal to the aperture 303. An electric motor 305 is fixed at an end of the housing 301 and is fixed by a motor mount 307 to a housing hub 309 of the housing 301. A slip ring 313 provides an electrical communication path between the electric motor 305 and the controller 112.

Figure 3C:
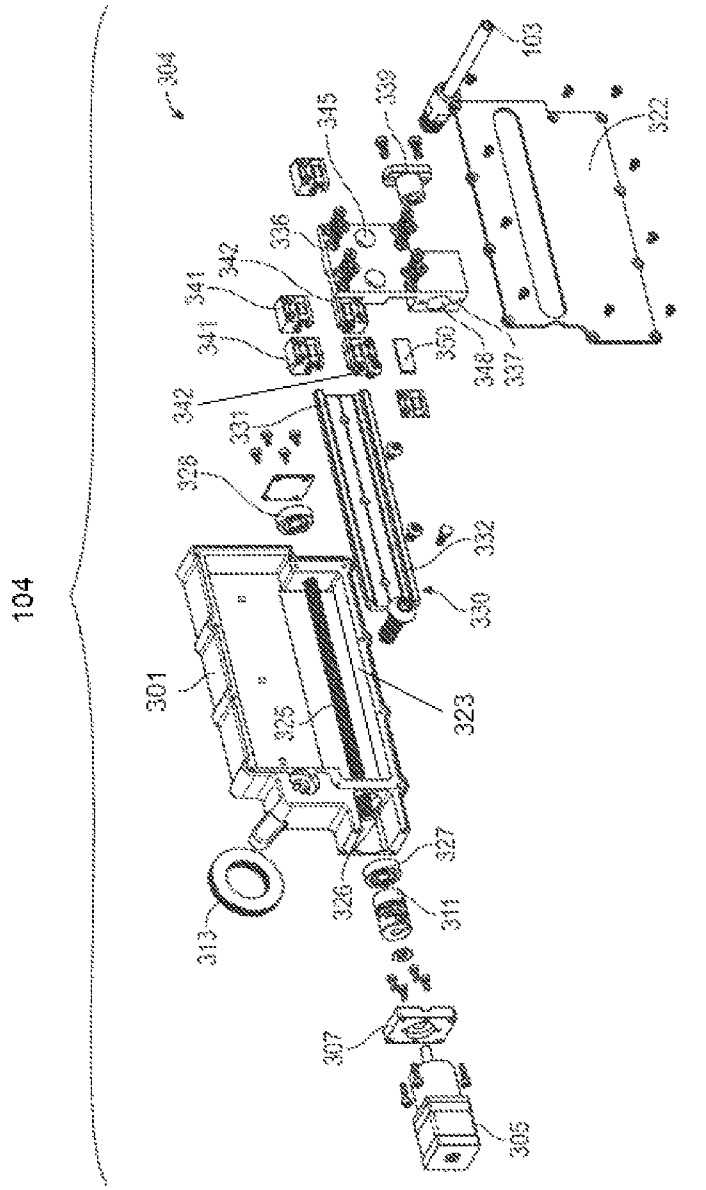

FIG. 3C is an exploded view of the pedal arm assembly 104. A shaft coupler 311 connects the drive of the electric motor 305 to a drivescrew 325 mounted inside the housing 301. The drivescrew 325 is elongate and extends through drivescrew holes 326 positioned near the bottom of the housing 301. Bearings 327, 328 fixed in the drivescrew holes 326 support the drivescrew 325 for rotation. The drivescrew 325 is threaded at least between the bearings 327, 328. The drivescrew 325 can be threaded its entire length. The drivescrew 325 can be rotated in either a clockwise direction or a counterclockwise direction by the electric motor 305.

A rail 330 is fixed in the housing 301 above the drivescrew 325. The rail 330 is elongate and defines a travel path of the spindle 103. The rail 330 includes a top guide edge 331 at the top of the rail and a bottom guide edge 332 at the bottom of the rail.

The carriage 304 includes a top member 336 configured to mechanically engage the rail 330 to guide the carriage 304 along the longitudinal length of the rail 330. The carriage 304 includes a bottom member 337 to engage the drivescrew 325 to provide the motive force to move the carriage in the housing 301. The top member 336 is fixed to the bottom member 337. In an example embodiment, the top member 336 and bottom member 337 are formed from a unitary block of a rigid material (e.g., a metal or rigid polymer). A plurality of upper bearing blocks 341 fixed to the top member 336 is slidably engaged on the top guide edge 331. A plurality of lower bearing blocks 342 fixed to the top member 336, below the upper bearing blocks 341, is slidably engaged on the bottom guide edge 332. The bottom member 337 includes a throughbore 348 to receive the drivescrew 325. In an example embodiment, the throughbore 348 is threaded to engage threads of the drivescrew 325. In the illustrated example, a carriage coupling 339 is fixed to the bottom member 337 at the throughbore 348. The carriage coupling 339 is internally threaded to mate with the external threads of the drivescrew 325. In operation, the electric motor 305 turns the drivescrew 325, and the carriage 304 through the carriage coupling 339 translates the rotational motion of the drivescrew to linear movement of the carriage 304 on the rail 330.

The carriage 304 includes a spindle engagement 345 to fix the spindle 103 thereto. The spindle engagement 345 can include a threaded recess to receive a threaded carriage end of the spindle 103.

A cover plate 322 is provided on the housing 301 to cover the recesses 323 receiving the internal components. The cover plate 322 includes the aperture 303 through which the spindle extends. The aperture 303 and the spindle engagement 345 are aligned to allow the spindle 103 to travel on the carriage 304 in the aperture 303.

A slide pad 350 is provided on the bottom member 337. The slide pad 350 slidably engages the housing (e.g., laterally adjacent the drivescrew 325) to assist in preventing rotation of the carriage 304 in the housing.

Figure 4A:
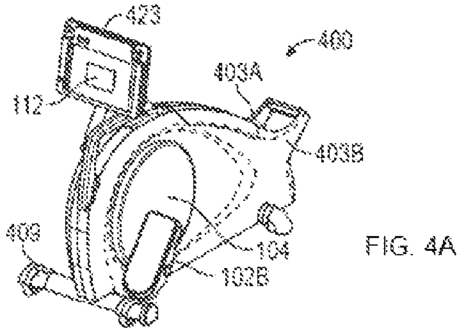
FIGS. 4A-4D are views of the rehabilitation/exercise system in accordance with the present disclosure.
Figure 4B:
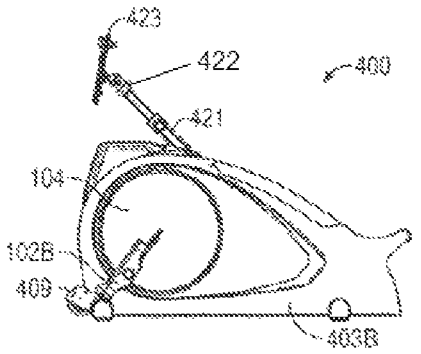
Figure 4C:
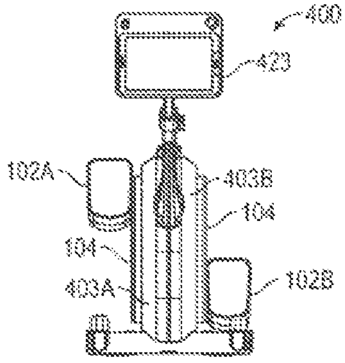
Figure 4D:
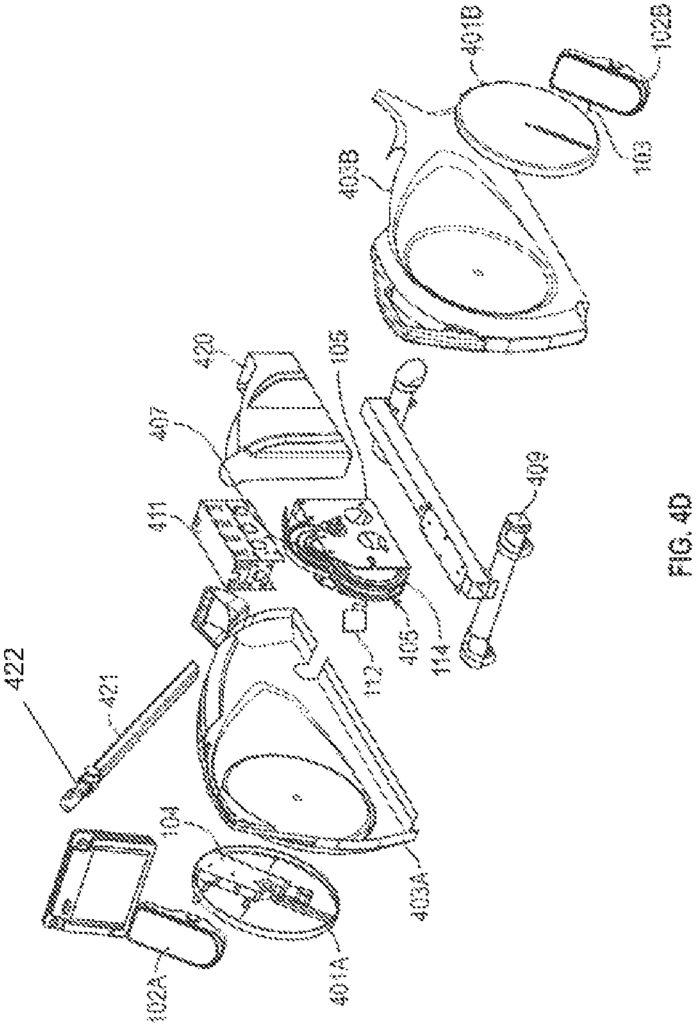

FIGS. 4A, 4B, and 4C are a perspective view, a side view and a rear view, respectively, of an exercise or rehabilitation electromechanical system 400 that uses the pedal and pedal arm assembly (102, 104) described herein. FIG. 4D is an exploded view of the exercise or rehabilitation electromechanical device 400. The electromechanical system 400 includes one or more pedals that couple to one or more radially-adjustable couplings. The electromechanical system 400 includes a left pedal 102A that couples to a left radially-adjustable coupling assembly 401A via a spindle 103 through a shroud 401. The radially-adjustable coupling 401A and shroud 401 can be disposed in a circular opening of a left outer cover 403 and the pedal arm assembly 104 can be secured to a drive sub-assembly 405. The drive sub-assembly 405 may include the electric motor 114 that is operably coupled to the controller 112. The drive sub-assembly 405 may include one or more braking mechanisms, such as disc brakes, which enable instantaneously locking the electric motor 114 or stopping the electric motor 114 over a period of time. The electric motor 114 may be any suitable electric motor (e.g., a crystallite electric motor). The electric motor 114 may drive the axle 105 directly. In the illustrated example, the motor connects to a central pulley 407 that is fixed to the axle 105. The central pulley 407 can be connected to the drive axle of the electric motor 114 by a belt or chain or can be directly connected to the electric motor 114. The central pulley 407 can be a lightweight polymer wheel having apertures therein to save weight. The central pulley 407 is lightweight such that it does not provide any significant inertial energy that resists movement of the pedals 102 in use. The drive sub-assembly 405 can be secured to a frame sub-assembly 409, which includes a main support spine and legs extending outwardly therefrom. One set of legs may include wheels to move the system. A top support sub-assembly 411 may be secured on top of the drive sub-assembly 405 to essentially enclose the electric motor 114 and the central pulley 407. A right pedal 102B couples to a right radially-adjustable coupling 401B via a right pedal arm assembly 104 disposed within a cavity of the right radially-adjustable coupling 401B. The right pedal 102B is supported in the same manner as the left pedal 102A, but on the other side and 180 degrees out of phase with the left pedal 102A. An internal volume may be defined when the left outer cover 403A and the right outer cover 403B are secured together around the frame sub-assembly 409. The left outer cover 403A and the right outer cover 403B may also make up the frame of the system 400 when secured together. The drive sub-assembly 405, top support sub-assembly 411, and pedal arm assemblies 104 may be disposed within the internal volume upon assembly. A storage compartment 420 may be secured to the frame sub-assembly 409 to enclose the drive sub-assembly 405 and top support sub-assembly 411.

Further, a computing device arm assembly 421 may be secured to the frame and a computing device mount assembly 422 may be secured to an end of the computing device arm assembly 421. A computing device 423 (e.g., controller 112) may be attached or detached from the computing device mount assembly 421 as desired during operation of the system 400.

Figure 5:
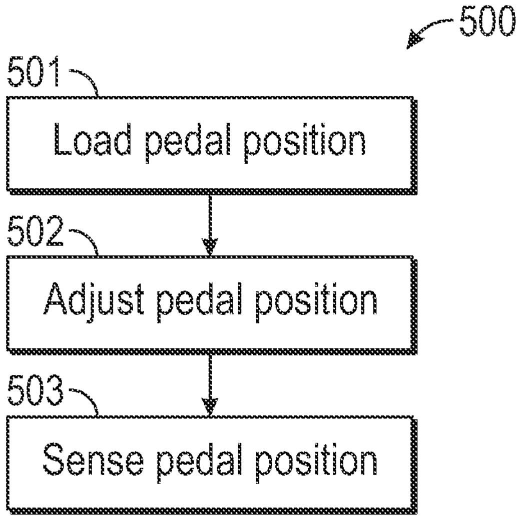
FIG. 5 is a flowchart of a method for operating the rehabilitation/exercise system in accordance with the present disclosure.

FIG. 5 is a flowchart of a method 500 for controlling the pedal position. At 501, a pedal position is loaded into the controller 112 or memory 113. The pedal position can be entered via a user interface through an I/O on the base 110. The user interface can present a treatment plan (e.g., for rehabilitation or exercise) for a user according to certain embodiments of this disclosure. The user interface can be at the base or at a remote device in communication with the base. The treatment plan can be set by a user (e.g., a physician, nurse, physical therapist, patient, or any other suitable user). The pedal position can be part of an individualized treatment plan taking into account the condition of the user (e.g., recovery after a surgery, knee surgery, joint replacement, a muscle conditions or any other suitable condition).

At 502, the radial position of a pedal relative to the axle is electrically adjusted in response to a control signal output by the controller 112 to control the electric motor 305 to position the carriage 304, and hence the pedal 102, through the spindle 103. In an example embodiment, the electric motor 305 is connected to the carriage 304 through a linkage (e.g., the drivescrew 325 to linearly move the spindle 103). In an example embodiment, the radial position of the pedal is adjusted, during a revolution of the pedal, to produce an elliptical pedal path relative to the axle. The radial position of the pedal can be adjusted in response to the control signal during a user pedaling the pedal.

At 503, the rotational motion of the user engaged with the pedal is controlled. The controller can control the position of the pedal 103 in real time according to the treatment plan. The position of a right pedal can be different than that of the left pedal. The pedal can also change position during the use. The pedal can also sense the force a user is applying to the pedal. A force value can be sent from the pedal to the controller, which can be remote from the pedal.

The rotational position of the pedal is sensed. The rotational position of the pedal can provide information regarding the use, e.g., to control radial position of the pedal, the rotational motion (e.g., speed, velocity, acceleration, etc.) and the like.

Figure 6:
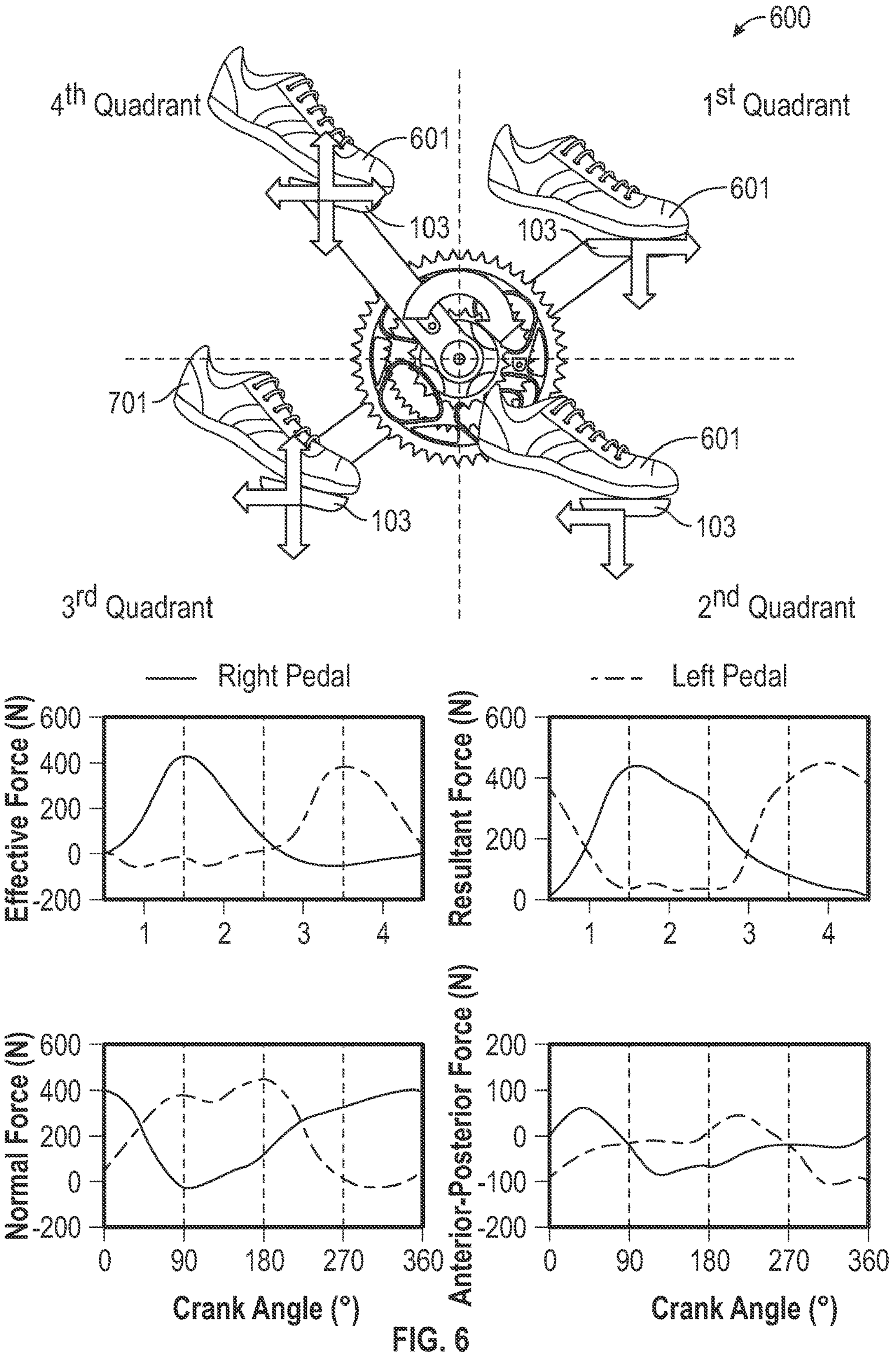
FIG. 6 is a schematic view of a pedal and resulting forces in accordance with the present disclosure.

FIG. 6 is a schematic view 600 of a pedal 103 and resultant force vectors. The pedal 103 will experience greater applied force from the foot 601 (represented by the shoe) in the first quadrant and the second quadrant (i.e., when driving the pedal down). There will be the less applied force in the third quadrant and fourth quadrants. When pedaling a bicycle with forward motion and inertial energy, or a stationary bike with a heavy flywheel, e.g., greater than twenty pounds, the user experiences inertial force that affects the feel experienced by the user. In an example embodiment, the drive components (e.g., the electric motor, the pulley, the pedal connector assembly, and the pedals) all have a mass of less than 10 kilograms. The inertial force can be felt when there is a reduced applied force, e.g., when both pedals are not applying a force. A heavily weighted flywheel will continue the force felt by the user (e.g., greater than 15 kg, greater than 20 kg, or more). However, an example embodiment of the present disclosure does not have a heavy flywheel. In this case, the electric motor must be controlled to simulate a flywheel and the inertia of the flywheel, which can be felt by a user, such that the electric motor controls a resistance to travel of the pedals. If the electric motor did not provide increased force to the pedal, then the pedal would slow a greater amount. If the electric motor did not provide a resistance to the force applied by the user to the pedal, the user could not apply a sufficient force to the pedal. Thus, the control system simulates the flywheel by controlling the electric motor to drive the pulley when the one or more pedals are not rotating within a desired range. Controlling the electric motor 114 to simulate a flywheel can assist in keeping the user compliant with the treatment plan on the rehabilitation system 100.

Figure 7:
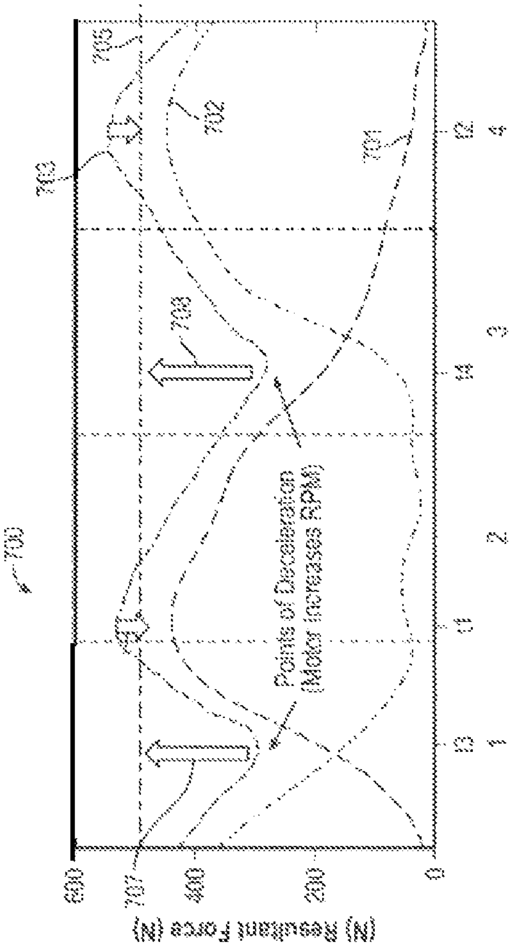
FIG. 7 is a graph showing the points at which the motor can maintain a set resultant force in accordance with the present disclosure.

FIG. 7 shows a graph 700 of pedaling forces from pedaling and a simulated flywheel from the electric motor 114. The applied force at the right pedal 701 peaks at time t1 essentially between quadrant 1 and 2. The quadrants are defined relative to the right pedal. The applied force at the left pedal 702 peaks at time t2 in quadrant 4. The sum of the applied forces of both the right pedal and the left pedal is shown at 703. At 705, there is shown the desired steady force that a user experiences with a flywheel. The desired level of force can be changed according to the rehabilitation regimen prescribed to the user, which can be stored in memory and used by a controller. In the illustrated example of FIG. 7, the force is set at about 500 N. It is desired, in some embodiments of the present disclosure, to simulate a flywheel by driving the electric motor 114 when the sum of forces 703 fall below the desired level of force 705. At time t3, the electric motor 114 must drive the pedals to accelerate the pedals so that the force at the pedals is at the desired level of force 705. The same occurs at time t4. The force applied by the electric motor 114 is schematically shown at 707, 708. At times t3, t4, the pedals are not receiving enough force from the user and the rotational speed will drop. The electric motor 114 applies an acceleration to keep the force essentially the same, i.e., by Newton's second law, F=m*a. In the present system 100, the mass is quite low so that the system is portable. Accordingly, the change in acceleration will have an effect on the force perceived by the user at the pedals as the mass of the drive components in the present rehabilitation system is low. At times t1 and t2, the force at the pedals is at its highest and is above the desired level of force 705. Here, the electric motor 114 will drop the force at the pedals. While there will be some variation from the desired level of force due to the forces applied to the pedals at different quadrants and positions of the pedals in the travel path, the force can be held in a range around the set value at 705.

Figure 8:
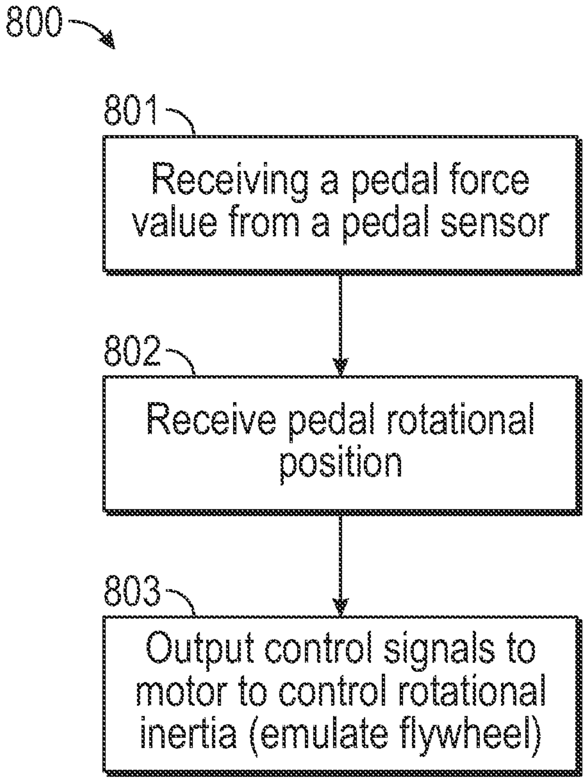
FIG. 8 is a flowchart of a method for operating the rehabilitation/exercise system in accordance with the present disclosure.

FIG. 8 is a method 800 of electromechanical rehabilitation using a simulated flywheel. At 801, a pedal force value is received from the pedal sensor to indicate the force being applied to the pedal by the user when pressing on the pedal. The pedal force can be sensed using a single sensor at each pedal. In an example embodiment, the pedal force value can be a statistically or mathematically computed value from a plurality of pedal sensors. The pedal force value, or total force, can be computed from a toe end force received as a toe signal from a toe sensor at the toe end of the pedal and a heel end force received as a heel signal from a heel sensor at a heel end of the pedal. The pedal force value can be the sum of the toe end force and the heel end force. The pedal force value can be received at the controller 112 or the computing device 423. The pedal force value can be transmitted over a physical connection, e.g., through the slip rings and over wires connected to the controller. The pedal force value can be wirelessly sent over a near field communication (e.g., using Bluetooth™ standard) from the sensor in the pedal to a remote receiver in base 110 or computing device 423.

As noted, power transmission to the motor on the pedal arm may be conducted via slip rings. Other embodiments can include a wireless power transmission system that can use transformer coils (such as thin pairs of them) on the main unit and the pedal arm. DC voltage can be wirelessly passed to the pedal arm to charge onboard battery pack(s). The controller can split the charge to left and right controllers for the respective pedal arms. The motor control of the pedal arms can be controlled by the onboard controller. Embodiments of the transformer coils can be similar or identical to retail mobile phone wireless chargers.

Another aspect of the assembly can include limit switches. Some versions comprise microswitches, such as one at each end of the carriage travel. The state of the limit switches can be interpreted by the controller to detect when the carriage/spindle assembly is at either end of travel. The limit switches are optional.

At 802, the pedal rotational position is received, e.g., at the controller 112 or computing device 423. The rotational position of the pedal can be used to compute the rotational velocity or rotational speed of the pedals. Any change in velocity can indicate a change in acceleration.

At 803, motor control signals are output. The one or more control signals output to the electric motor 114 can cause the electric motor 114 to control rotational inertia at the pedals based at least upon the pedal force value, a set pedal resistance value, and a pedal velocity. The pedal velocity can be computed from the position of the pedal over time. The pedal resistance value can be set in during programming an exercise regimen or a rehabilitation regimen, e.g., through an I/O in the base 110 from a remote server and stored in the memory 113. In an example embodiment, if the pedal velocity is being maintained and the pedal force value is within a set range (which can be stored in the memory), a maintain-drive control signal is sent to the electric motor 114. The maintain-drive control signal operates the electric motor 114 to stay at a same mechanical drive output to the pedals, which will maintain a feel at the pedals that is the same, i.e., the inertia remains the same. In an example embodiment, if the pedal velocity is being maintained and the pedal force value is less than a prior pedal force value at a prior pedal revolution (e.g., the pedal velocity is maintained with less force than the previous pedal revolution in the same pedal position but during the immediately prior revolution), the maintain-drive control signal is sent.

In some embodiments, if the pedal velocity is less than a prior pedal velocity during a prior pedal revolution and the pedal force value is less than a prior pedal force value at the prior pedal revolution, an increase-motor-drive control signal can be sent to the electric motor 114. The increase-motor-drive control signal will cause the electric motor to rotate faster, i.e., accelerate, to increase the perceived inertial force at the pedals.

If the pedal force value is greater than the pedal force value during a prior pedal revolution or if the pedal velocity is greater than a prior pedal velocity during the prior pedal revolution, a decrease-motor-drive control signal can be sent to the electric motor. This will slow the electric motor and reduce the force at the pedals. The decrease-motor-drive control signal can be sent when the pedal velocity is more than a prior pedal velocity during a prior pedal revolution. The decrease-motor-drive control signal can be sent when the pedal force value is more than a pedal force value during a prior pedal revolution.

The control signals can cause the electric motor to control simulated rotational inertia applied to the pedals through an intermediate drive wheel connected to a drive axle to the pedals. This will simulate an inertial force perceived at the pedals by the user, where the inertial force would be provided by a flywheel in a traditional stationary exercise machine. This is useful in the present rehabilitation system as the electric motor 114 and any intermediate drive linkage between the electric motor 114 and the pedals (e.g., an intermediate drive wheel or pulley) is essentially free from or without adding inertial energy to the pedals.

Figure 9:
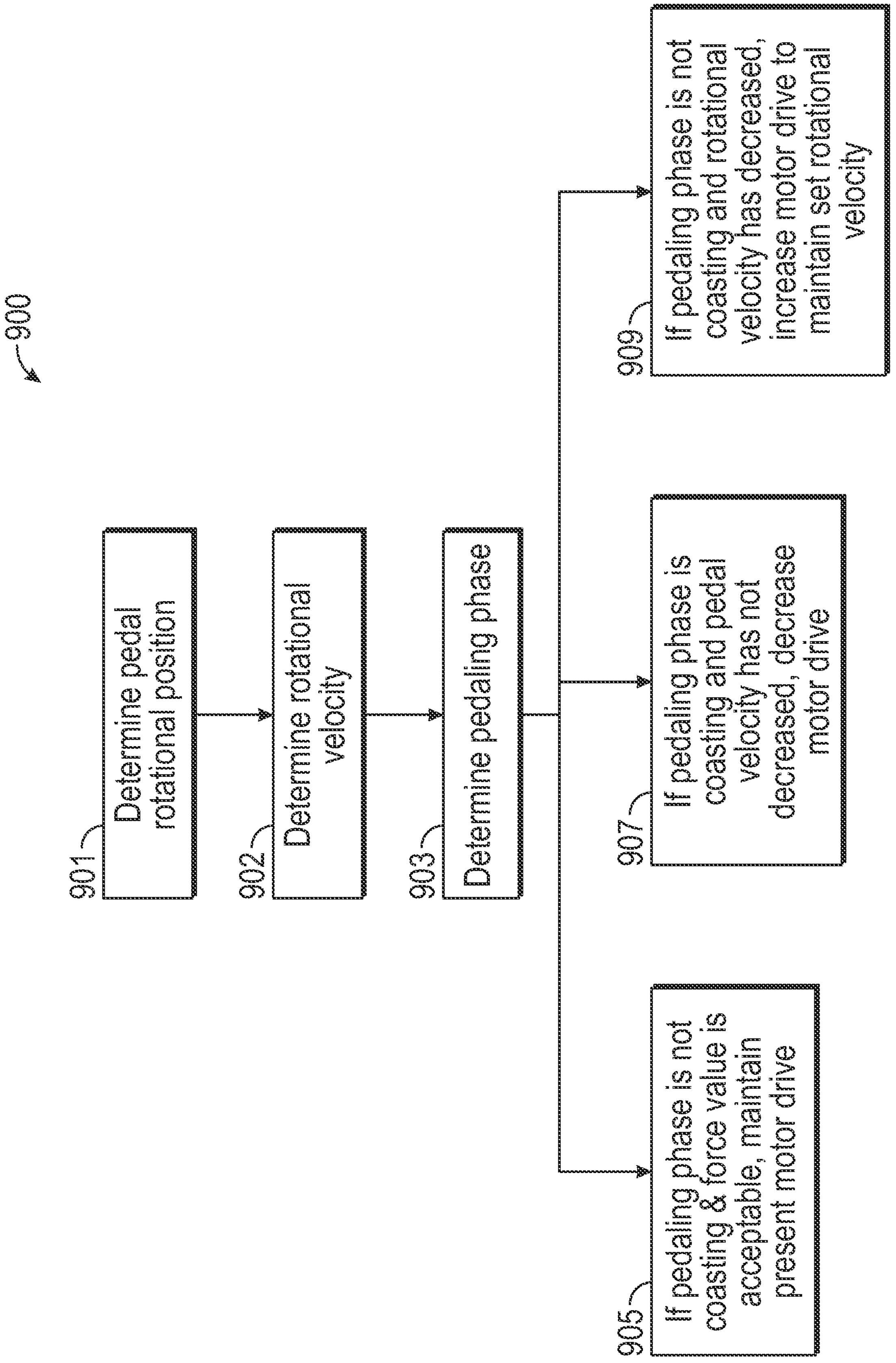
FIG. 9 is a flowchart of a method for operating the rehabilitation/exercise system in accordance with the present disclosure.

FIG. 9 is a method 900 for simulating a flywheel and controlling the force at the pedal as perceived by the user. At 901, the pedal position is determined. The pedal position can be determined by sensors on the pedals or by measuring the position of the spindle or axle. The position of the axle can be determined by reading the indicia on the axle as it turns. The pedals are fixed to the axle through the pedal arm assembly, and the radial position of the pedals is known as it is set by the control arm assembly. At 902, the rotational velocity of the pedals is determined. At 903, the pedaling phase is determined. The pedaling phase can be a phase in a rehabilitation regimen. For example, a phase can be an active phase with the user pedaling with force or a coasting phase where the user is pedaling slowly without applying much force to the pedals.

The method 900 then has three different ways it can produce electric motor control signals to control the operation of the electric motor driving the pedals. At 905, if the pedaling phase is not in a coasting phase and the sensed-force value is in a set range, a signal is sent to the electric motor to maintain a current drive of the electric motor at a present drive state to simulate a desired inertia on the one or more pedals. The force value can be set in memory of the device, e.g., as part of the rehabilitation regimen for the user. The force can be set as a value with a +/−buffer to establish a range. For example, when beginning a rehabilitation regimen, the force can be low for the first few pedaling events and increase thereafter. The force can be measured at the pedal using the devices and methods described herein.

At 907, if the pedaling phase is in the coasting phase and the rotational velocity has not decreased, decrease the current drive of the electric motor and maintain a decreasing inertia on the one or more pedals. This should simulate inertia at the pedals, e.g., simulate a flywheel when the system is slowing gradually. The electric motor will continue to apply a force to the pedals, but the force decreases with each revolution of the pedals or over time to simulate the flywheel producing the inertial force.

At 909, if the pedaling phase is not in the coasting phase and the rotational velocity has decreased, increase drive of the electric motor to maintain a desired rotational velocity. That is, the electric motor will accelerate the pedals to maintain the force at the pedals as perceived by the user. The increase in the drive by the electric motor can be maintained for a time period or a number of revolutions of the pedals. In an example embodiment, the electric motor 114 increases the drive for ⅛, ¼, or ⅜ of a revolution of the pedal.

The controller as described herein can output motor control signals that control the force output by the electric motor to the pedals. The controller is configured to increase drive of the electric motor to increase the rotational velocity of the one or more pedals when the one or more pedals are at or below a minimum sensed-force threshold, and to decrease drive to reduce the rotational velocity of the one or more pedals when the one or more pedals are at a maximum sensed-force threshold. The minimum sensed-force threshold and the maximum sensed-force threshold are the forces sensed at the pedals. The values of the minimum and the maximum can be set in the program for an individual's rehabilitation schedule on the rehabilitation system. The program should limit the range of motion of the user by adjusting the radial position of the pedals and control the amount of force that the user can apply to the pedals. For the force to be at any given value, the amount of force applied to the pedals requires that pedals resist the force being applied. That is, if the pedal will free spin above a maximum force, then the user cannot apply more than that force to the pedal. The electric motor can also resist the rotational movement of the pedals by refusing to turn until the minimum force is applied to the pedals. The controller, through output of control signals to the electric motor, simulates a flywheel by controlling operation of the electric motor to drive the pulley (or axle wheel) when the one or more pedals are not rotating in a desired range of either force or rotational velocity.

The force value in the controller can be the sum of forces to maintain a level of drive at the one or more pedals below a peak of the sum of forces and above a valley of the sum of forces. That is, the sum of forces is derived from the forces at both the pedals, one of which can be engaged by a user's good leg and the other by the user's leg in need of exercise or rehabilitation.

The foregoing description of the embodiments describes some embodiments with regard to exercise system or a rehabilitation system or both. These phrases are used for convenience of description. The phrases exercise system or rehabilitation system as used herein include any device that is driven by or causes motion of a person or animal, typically to provide travel of body parts. The exercise system can include devices that cause travel of an extremity or appendage, i.e., a leg, an arm, a hand, or a foot. Other embodiments of exercise systems or rehabilitation systems can be designed for range of motion of joints.

The foregoing description describes a pedal, which is engaged by a user's foot to impart force to the pedal and rotate the pedals along a travel path defined by the position of the pedal relative to the rotational axis of the device. The description relating to a pedal herein can also be applied to handgrips such that a user can grip the handgrips and the device can operate in the same manner as described herein. In an example embodiment, the term pedal can include a handgrip.

The rehabilitation and exercise device, as described herein, may take the form as depicted of a traditional exercise/rehabilitation device which is non-portable and remains in a fixed location, such as a rehabilitation clinic or medical practice. In another example embodiment, the rehabilitation and exercise device may be configured to be a smaller, lighter and more portable unit so that it is able to be easily transported to different locations at which rehabilitation or treatment is to be provided, such as a plurality of patients' homes, alternative care facilities or the like.

Consistent with the above disclosure, the examples of systems and method enumerated in the following clauses are specifically contemplated and are intended as a non-limiting set of examples.

1. A pedal assembly for equipment for electromechanical exercise or rehabilitation of a user, comprising:
- a pedal configured to be engaged by the user;
- a spindle mounted to the pedal and having a spindle axis; and
- a pedal arm assembly mounted to the spindle for support thereof, the pedal arm assembly is configured to be coupled to a rotational axle of the equipment, the rotational axis is radially offset from the spindle axis to define a range of radial travel of the pedal relative to the rotational axle, the pedal arm assembly comprising a coupling assembly that is electrically actuated to selectively adjust a radial position of the pedal relative to the rotational axle in response to a control signal.

2. The pedal assembly of any of these examples, wherein the pedal arm assembly comprises a housing with an elongate aperture through which the spindle extends; wherein the coupling assembly comprises a carriage mounted in the housing to support the spindle, and an electric motor coupled to the carriage to linearly move the spindle relative to the housing.

3. The pedal assembly of any of these examples, wherein the elongate aperture is orthogonal to the spindle axis.

4. The pedal assembly of any of these examples, wherein the coupling assembly comprises a leadscrew configured to be rotated by the electric motor and threadingly coupled to the carriage.

5. The pedal assembly of any of these examples, wherein the carriage comprises a throughbore that receives the leadscrew and a threaded nut mounted adjacent to the throughbore, such that the threaded nut threadingly engages the leadscrew.

6. The pedal assembly of any of these examples, wherein the coupling assembly comprises a rail adjacent and parallel to the leadscrew, the rail and the leadscrew are in the housing, and the carriage engages the rail for linear travel along the rail in the range of radial travel of the pedal.

7. The pedal assembly of any of these examples, wherein the coupling assembly comprises a slide pad between the carriage and an interior wall of the housing, and the slide pad is adjacent to the leadscrew.

8. The pedal assembly of any of these examples wherein, during operation, the coupling assembly is configured to adjust the radial position of the pedal in response to the control signal.

9. The pedal assembly of any of these examples, wherein the coupling assembly is configured to adjust the radial position of the pedal to produce an elliptical pedal path, relative to the rotational axle, during a revolution of the pedal.

10. The pedal assembly of any of these examples, wherein the pedal comprises a pressure sensor to sense a force applied to the pedal, and transmit the sensed force to a distal receiver.

11. The pedal assembly of any of these examples, wherein the pedal comprises a pedal bottom to receive and pivot about the spindle, the pressure sensor comprises a plurality of pressure sensors, a base plate on the pedal bottom to support the plurality of pressure sensors, and a pedal top positioned above the base plate and operatively engaged with the plurality of pressure sensors to transit force from the user of the pedal to the plurality of pressure sensors.

12. The pedal assembly of any of these examples, wherein the plurality of pressure sensors comprises a toe sensor to sense a first pressure and a heel sensor to sense a second pressure, and the first pressure and the second pressure are used by the control system to determine a net force on the pedal.

13. The pedal assembly of any of these examples, wherein the transmitted sensed force signal is used by a controller to adjust at least one of rotation of the pedals or the radial position of the pedals.

14. The pedal assembly of any of these examples, wherein the coupling assembly is configured to translate rotational motion of the electric motor into radial motion of the pedals.

15. A method for electromechanical exercise or rehabilitation, comprising:
- electrically adjusting a radial position of a pedal relative to a rotational axle in response to a control signal;
- regulating rotational motion of an appendage of a user engaged with the pedal;
- sensing a rotational position of the pedal for use in further electrically adjusting the radial position of the pedal; and
- further electrically adjusting the radial position of the pedal in response to another control signal.

16. The method of any of these examples, wherein electrically adjusting the radial position of the pedal comprises controlling an electric motor coupled to a carriage to linearly move a spindle in a housing.

17. The method of any of these examples, wherein electrically adjusting the radial position of the pedal comprises mechanically supporting the carriage on a rail of the housing for linear travel of the carriage over a range of radial travel of the pedal.

18. The method of any of these examples, wherein electrically adjusting the radial position of the pedal comprises rotating a leadscrew with the electric motor to linearly move the carriage.

19. The method of any of these examples, wherein electrically adjusting the radial position of the pedal comprises, during a revolution of the pedal, adjusting the radial position of the pedal to produce an elliptical pedal path relative to the rotational axle.

20. The method of any of these examples, wherein electrically adjusting the radial position of the pedal occurs while the pedal is rotating about the rotational axle, and regulating rotational motion comprises sensing a force applied to the pedal and transmitting the sensed force to a remote receiver.

The structures connected to the pedals have a low mass and, hence, a low inertial energy potential. The motor, e.g., through a wheel connected to the axle, can provide the resistive force at the pedals and the inertial force once the pedals are turning.

The foregoing description of the embodiments describes some embodiments with regard to an exercise system or a rehabilitation system or both. These phrases are used for convenience of description. The phrases exercise system or rehabilitation system as used herein include any device that is driven by or causes motion of a person or animal, typically to provide travel of body parts. The exercise system can include devices that cause travel of an appendage, i.e., a leg, an arm, a hand, or a foot. Other exercise systems or rehabilitation systems can be designed for a range of motion of joints.

The foregoing description describes a pedal, which is engaged by a user's foot to impart force to the pedal and rotate the pedals along a travel path defined by the position of the pedal relative to the rotational axis of the device. The description relating to a pedal herein can also be applied to handgrips such that a user can grip the handgrips and the device can operate in the same manner as described herein. In an example embodiment, the term pedal can include a handgrip.

The rehabilitation and exercise device, as described herein, may take the form as depicted of a traditional exercise/rehabilitation device which is more or less non-portable and remains in a fixed location, such as a rehabilitation clinic or medical practice. In another example embodiment, the rehabilitation and exercise device may be configured to be a smaller, lighter and more portable unit so that it is able to be easily transported to different locations at which rehabilitation or treatment is to be provided, such as a plurality of patient's homes, alternative care facilities or the like. In other embodiments, this equipment can be used in other unrelated applications, such as other types of pedal-powered vehicles (e.g., bicycles, etc.), a hand-powered winch, etc.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. The benefits, advantages, solutions to problems, and any feature(s) that can cause any benefit, advantage, or solution to occur or become more pronounced are not to be construed as a critical, required, sacrosanct or an essential feature of any or all the claims.

What is claimed is:

1. An exercise or rehabilitation electromechanical device comprising:
- a drive sub-assembly comprising:
  - a first electric motor operably coupled to a controller;
- a pedal assembly secured to the drive sub-assembly, the pedal assembly comprising:
  - a pedal configured to be engaged by a user,
  - a spindle mounted to the pedal and having a spindle axis,
  - a pedal arm assembly mounted to the spindle for support of the pedal arm assembly, and
  - a coupling assembly comprising a carriage that supports the spindle, and a second electric motor coupled to the carriage to linearly move the spindle, the coupling assembly being electrically actuated to selectively adjust a radial position of the pedal relative to a rotational axle in response to a control signal,
  - a housing with an elongate aperture through which the spindle extends, wherein the carriage is mounted in the housing to support the spindle, and the second electric motor linearly moves the spindle relative to the housing;
- the pedal arm assembly is configured to be coupled to the rotational axle, the rotational axle is radially offset from the spindle to define a range of circumferential travel of the pedal around the rotational axle; and
- at least one pressure sensor supported by the pedal to circumferentially rotate around the rotational axle with the pedal, and to sense a force applied to the pedal and transmit the force to the controller, the controller is configured to receive a pedal rotational position and, in response, send motor control signals to the first electric motor to cause the first electric motor to control rotational inertia at the pedal based on a pedal force value determined from the force applied to the pedal.

2. The electromechanical device of claim 1, wherein the coupling assembly comprises a drivescrew configured to be rotated by the second electric motor and threadingly coupled to the carriage.

3. The electromechanical device of claim 2, wherein the carriage comprises a throughbore that receives the drivescrew and a threaded nut mounted adjacent to the throughbore, such that the threaded nut threadingly engages the drivescrew.

4. The electromechanical device of claim 3, wherein the coupling assembly comprises a rail adjacent and parallel to the drivescrew, the rail and the drivescrew are in the housing, and the carriage engages the rail for linear travel along the rail in the range of circumferential travel of the pedal.

5. The electromechanical device of claim 2, wherein the coupling assembly comprises a slide pad between the carriage and an interior wall of the housing, and the slide pad is adjacent to the drivescrew.

6. The electromechanical device of claim 2, wherein, during operation, the coupling assembly is configured to adjust the radial position of the pedal in response to the control signal.

7. The electromechanical device of claim 2, wherein the coupling assembly is configured to adjust the radial position of the pedal to produce an elliptical pedal path, relative to the rotational axle, during a revolution of the pedal.

8. The electromechanical device of claim 1, wherein the pedal comprises a pedal bottom, the at least one pressure sensor comprises a plurality of pressure sensors, a base plate on the pedal bottom to support the plurality of pressure sensors, and a pedal top positioned above the base plate and operatively engaged with the plurality of pressure sensors to transmit force from the user of the pedal to the plurality of pressure sensors.

9. The electromechanical device of claim 8, wherein the plurality of pressure sensors comprises a toe sensor to sense a first pressure and a heel sensor to sense a second pressure, and the first pressure and the second pressure are used by the controller to determine a net force on the pedal, the pedal force value is determined from the net force.

10. The electromechanical device of claim 1, wherein the controller is configured to send the motor control signals to the first electric motor based on the pedal force value, a set pedal resistance value, and a pedal velocity determined from the pedal rotational position.

11. The electromechanical device of claim 1, wherein the elongate aperture is orthogonal to the spindle axis.

12. A method for electromechanical exercise or rehabilitation, comprising:

electrically adjusting a radial position of a pedal relative to a rotational axle in response to a control signal by controlling an electric motor coupled to a carriage to linearly move a spindle in a housing;

sensing a rotational position of the pedal for use in further electrically adjusting the radial position of the pedal;

further electrically adjusting the radial position of the pedal in response to another control signal; and controlling rotational inertia of the pedal based on a detected pedal force value from a pressure sensor supported by the pedal that circumferentially rotates around the rotational axle with the pedal.

13. The method of claim 12, wherein electrically adjusting the radial position of the pedal comprises mechanically supporting the carriage on a rail of the housing for linear travel of the carriage over a range of radial travel of the pedal.

14. The method of claim 12, wherein electrically adjusting the radial position of the pedal comprises rotating a drivescrew with the electric motor to linearly move the carriage.

15. The method of claim 12, wherein electrically adjusting the radial position of the pedal comprises, during a revolution of the pedal, adjusting the radial position of the pedal to produce an elliptical pedal path relative to the rotational axle.

16. The method of claim 12, wherein electrically adjusting the radial position of the pedal occurs while the pedal is rotating about the rotational axle, and regulating rotational motion comprises sensing a force applied to the pedal and transmitting the sensed force to a remote receiver.

17. The method of claim 12, wherein rotational inertia at the pedal is further controlled based on a set pedal resistance value, and a pedal velocity determined from the rotational position of the pedal.

* * * * *